(12) United States Patent
Noro et al.

(10) Patent No.: US 11,507,768 B2
(45) Date of Patent: Nov. 22, 2022

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Hideo Noro, Tokyo (JP); Yoshinori Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/918,945

(22) Filed: Jul. 1, 2020

(65) Prior Publication Data

US 2021/0004571 A1   Jan. 7, 2021

(30) Foreign Application Priority Data

Jul. 4, 2019   (JP) .............................. JP2019-125114

(51) Int. Cl.
*G06K 9/00*   (2006.01)

(52) U.S. Cl.
CPC ................................ *G06K 9/00288* (2013.01)

(58) Field of Classification Search
CPC .. G06K 9/00771; G06K 9/72; G06K 9/00369; G06K 9/00288; G06K 2209/27; G06V 40/103; G06V 40/172; G06V 20/52; G06V 10/768; G06V 2201/10
See application file for complete search history.

(56) References Cited

U.S. PATENT DOCUMENTS

| 2011/0150278 A1* | 6/2011 | Shimizu | G06K 9/00288 |
| | | | 382/103 |
| 2011/0158536 A1* | 6/2011 | Nakano | G06K 9/00281 |
| | | | 382/190 |
| 2013/0266196 A1* | 10/2013 | Kono | G06K 9/00771 |
| | | | 382/118 |

(Continued)

FOREIGN PATENT DOCUMENTS

JP   2006221355 A   8/2006

*Primary Examiner* — Syed Haider
(74) *Attorney, Agent, or Firm* — Canon U.S.A., Inc. IP Division

(57) ABSTRACT

An information processing apparatus includes an estimation unit configured to estimate, based on a feature of a person of interest contained in an image captured in each of a plurality of regions and a feature of a previously set registered person, a certainty that the person of interest is the registered person, and an updating unit configured to, with respect to a first person of interest subjected to image capturing in a first region out of the plurality of regions, in a case where a period for which a state in which a certainty that a second person of interest contained in an image captured in a second region different from the first region is the registered person is larger than a threshold value is kept is longer than a predetermined period, perform updating in such a way as to lower a certainty that the first person of interest in the first region is the registered person, and, in a case where the period for which the state in which the certainty that the second person of interest is the registered person is larger than the threshold value is kept is shorter than the predetermined period, perform updating in such a way as not to lower the certainty that the first person of interest in the first region is the registered person.

20 Claims, 21 Drawing Sheets

(56) References Cited

U.S. PATENT DOCUMENTS

| | | | |
|---|---|---|---|
| 2015/0363636 A1* | 12/2015 | Tate | H04N 5/247 |
| | | | 382/118 |
| 2018/0047181 A1* | 2/2018 | Miyazaki | G06K 9/00295 |
| 2018/0081908 A1* | 3/2018 | Matsubara | G06T 7/248 |
| 2018/0239977 A1* | 8/2018 | Matsimanis | G06V 10/42 |
| 2020/0314332 A1* | 10/2020 | Senzaki | H04N 5/23225 |

* cited by examiner

FIG.4A

| INPUT IMAGE ID | a1 | b1 |
|---|---|---|
| IMAGE | | |
| CAMERA ID | a | b |
| IMAGE CAPTURING CLOCK TIME | t1 | t1 |
| SIZE | (2048,1536) | (2048,1536) |

FIG.4B

| INPUT IMAGE ID | a2 | b2 |
|---|---|---|
| IMAGE | | |
| CAMERA ID | a | b |
| IMAGE CAPTURING CLOCK TIME | t2 | t2 |
| SIZE | (2048,1536) | (2048,1536) |

FIG.5A

| PERSON CANDIDATE IMAGE ID | 1-1 | 1-2 | 1-3 |
|---|---|---|---|
| IMAGE | | | |
| AREA ID | a | a | b |
| IMAGE CAPTURING CLOCK TIME | t1 | t1 | t1 |
| INPUT IMAGE ID | a1 | a1 | b1 |
| POSITION | (889,400) | (618,434) | (1001,558) |
| SIZE | (356,1025) | (260,957) | (468,889) |

FIG.5B

| PERSON CANDIDATE IMAGE ID | 2-1 | 2-2 | 2-3 | 2-4 |
|---|---|---|---|---|
| IMAGE | | | | |
| AREA ID | a | a | b | b |
| IMAGE CAPTURING CLOCK TIME | t2 | t2 | t2 | t2 |
| INPUT IMAGE ID | a2 | a2 | b2 | b2 |
| POSITION | (889,400) | (618,434) | (1001,558) | (0,502) |
| SIZE | (356,1025) | (260,957) | (468,889) | (414,1013) |

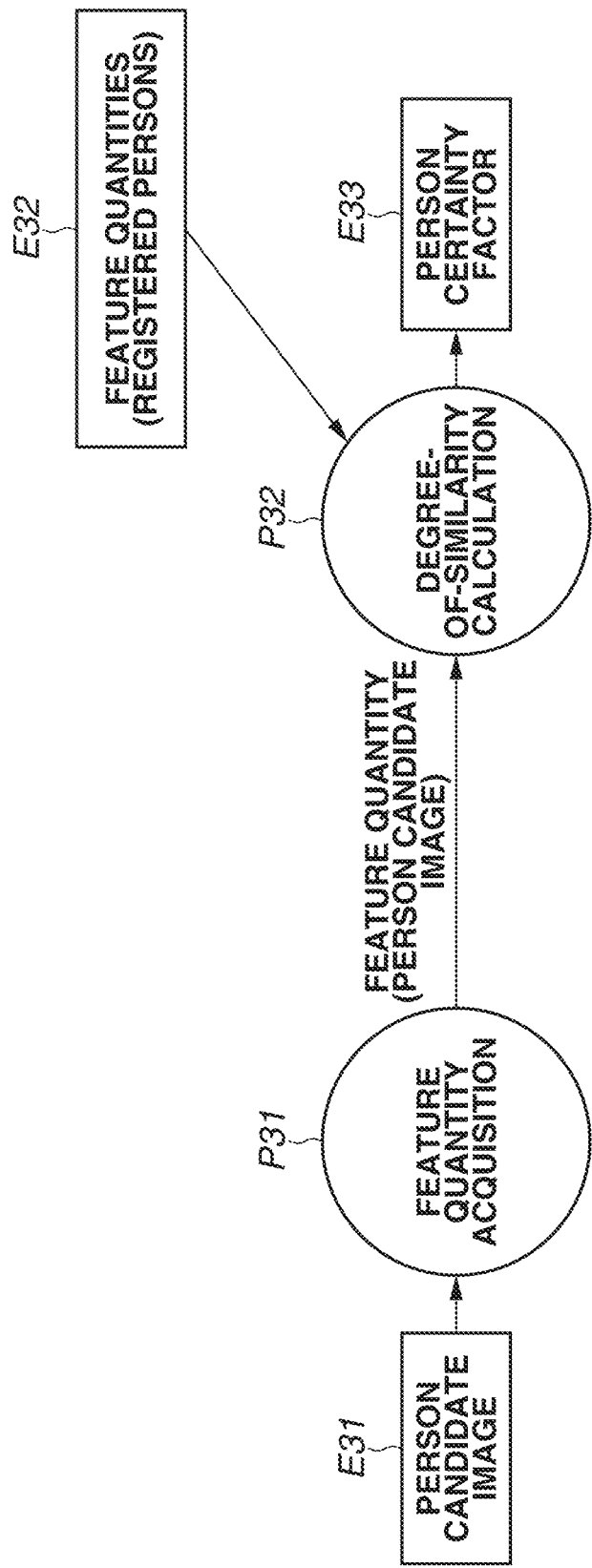

FIG.7

FEATURE QUANTITY
(REGISTERED PERSON)

| PERSON ID | PERSON NAME | FEATURE QUANTITY |
|---|---|---|
| 1 | Mr. A | Fa |
| 2 | Mr. B | Fb |
| 3 | Mr. C | Fc |

FIG.8
PERSON CERTAINTY FACTOR TABLE E43
| PERSON CANDIDATE IMAGE ID | | 1-1 | 1-2 | 1-3 |
|---|---|---|---|---|
| IMAGE | | 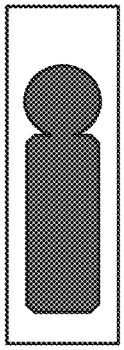 | 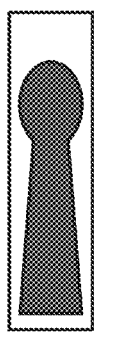 | 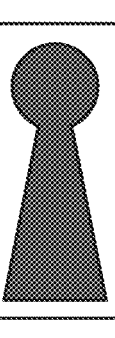 |
| AREA ID | | a | a | b |
| IMAGE CAPTURING CLOCK TIME | | t1 | t1 | t1 |
| INPUT IMAGE ID | | a1 | a1 | b1 |
| POSITION | | (889,400) | (618,434) | (1001,558) |
| SIZE | | (356,1025) | (260,957) | (468,889) |
| PERSON CERTAINTY FACTOR | Mr. A | 0.73 | 0.23 | 0.29 |
| | Mr. B | 0.75 | 0.21 | 0.31 |
| | Mr. C | 0.23 | 0.80 | 0.43 |

FIG.10A
AREA CERTAINTY FACTOR

| CLOCK TIME | AREA ID | PERSON | AREA CERTAINTY FACTOR | OTHER-AREA CERTAINTY FACTOR |
|---|---|---|---|---|
| t1 | a | Mr. A | 0.51 | 0.20 |
| t1 | a | Mr. B | 0.53 | 0.22 |
| t1 | a | Mr. C | 0.56 | 0.30 |
| t1 | b | Mr. A | 0.20 | 0.51 |
| t1 | b | Mr. B | 0.22 | 0.53 |
| t1 | b | Mr. C | 0.30 | 0.56 |

FIG.10B
AREA CERTAINTY FACTOR

| CLOCK TIME | AREA ID | PERSON | AREA CERTAINTY FACTOR | OTHER-AREA CERTAINTY FACTOR |
|---|---|---|---|---|
| t2 | a | Mr. A | 0.66 | 0.41 |
| t2 | a | Mr. B | 0.68 | 0.65 |
| t2 | a | Mr. C | 0.73 | 0.38 |
| t2 | b | Mr. A | 0.41 | 0.66 |
| t2 | b | Mr. B | 0.65 | 0.68 |
| t2 | b | Mr. C | 0.38 | 0.73 |

FIG.10C
AREA CERTAINTY FACTOR

| CLOCK TIME | AREA ID | PERSON | AREA CERTAINTY FACTOR | OTHER-AREA CERTAINTY FACTOR |
|---|---|---|---|---|
| t20 | a | Mr. A | 0.73 | 0.43 |
| t20 | a | Mr. B | 0.45 | 0.86 |
| t20 | a | Mr. C | 0.81 | 0.31 |
| t20 | b | Mr. A | 0.43 | 0.73 |
| t20 | b | Mr. B | 0.86 | 0.45 |
| t20 | b | Mr. C | 0.31 | 0.81 |

FIG.12A

PERSON CERTAINTY FACTOR TABLE

| PERSON CANDIDATE IMAGE ID | | 2-1 | 2-2 | 2-3 | 2-4 |
|---|---|---|---|---|---|
| IMAGE | | | | | |
| AREA ID | | a | a | b | b |
| IMAGE CAPTURING CLOCK TIME | | t2 | t2 | t2 | t2 |
| INPUT IMAGE ID | | a2 | a2 | b2 | b2 |
| POSITION | | (889,400) | (618,434) | (1001,558) | (0,502) |
| SIZE | | (356,1025) | (260,957) | (468,889) | (414,1013) |
| PERSON CERTAINTY FACTOR | Mr. A | 0.73 | 0.23 | 0.29 | 0.51 |
| | Mr. B | 0.75 | 0.21 | 0.31 | 0.85 |
| | Mr. C | 0.23 | 0.80 | 0.43 | 0.22 |

FIG.12B

PERSON CERTAINTY FACTOR TABLE

| PERSON CANDIDATE IMAGE ID | | 2-1 | 2-2 | 2-3 | 2-4 |
|---|---|---|---|---|---|
| IMAGE | | | | | |
| AREA ID | | a | a | b | b |
| IMAGE CAPTURING CLOCK TIME | | t2 | t2 | t2 | t2 |
| INPUT IMAGE ID | | a2 | a2 | b2 | b2 |
| POSITION | | (889,400) | (618,434) | (1001,558) | (0,502) |
| SIZE | | (356,1025) | (260,957) | (468,889) | (414,1013) |
| PERSON CERTAINTY FACTOR | Mr. A | 0.73 | 0.23 | 0.28 | 0.50 |
| | Mr. B | 0.75 | 0.21 | 0.30 | 0.83 |
| | Mr. C | 0.23 | 0.80 | 0.42 | 0.21 |

FIG.15

PERSON CERTAINTY FACTOR TABLE

| PERSON CANDIDATE IMAGE ID | | 20-1 | 20-2 | 20-3 | 20-4 |
|---|---|---|---|---|---|
| IMAGE | | | | | |
| AREA ID | | a | a | b | b |
| IMAGE CAPTURING CLOCK TIME | | t20 | t20 | t20 | t20 |
| INPUT IMAGE ID | | a20 | a20 | b20 | b20 |
| POSITION | | (889,400) | (618,434) | (1001,558) | (0,502) |
| SIZE | | (356,1025) | (260,957) | (468,889) | (414,1013) |
| PERSON CERTAINTY FACTOR | Mr. A | 0.73 | 0.25 | 0.25 | 0.43 |
| | Mr. B | 0.45 | 0.13 | 0.38 | 0.86 |
| | Mr. C | 0.28 | 0.81 | 0.31 | 0.16 |

INFORMATION PROCESSING APPARATUS, INFORMATION PROCESSING METHOD, AND STORAGE MEDIUM

BACKGROUND

Field of the Disclosure

Aspects of the present disclosure generally relate to a technique to recognize a person.

Description of the Related Art

In a plurality of conventional cameras which performs image capturing of respective different locations, images captured by the respective cameras at the same clock time may be, in some cases, recognized as one and the same person. However, since one and the same person cannot be present concurrently at such distant locations, some of the recognition results are erroneous. Taking into account this possibility, with respect to image recognition conducted with use of a plurality of cameras which performs image capturing of respective different locations, it is useful to introduce temporal and spatial constraints specifying a region of space in which a person who moves at a realistic movement speed can be present within a given length of time. Japanese Patent Application Laid-Open No. 2006-221355 discusses a technique which uses the above-mentioned spatial constraint and, in a case where, with regard to a given person contained in an image captured in a specific region, a registered person has been detected in a region to which the given person is considered to be unable to move from the specific region a predetermined period before, recognizes the given person not to be the registered person.

The technique discussed in Japanese Patent Application Laid-Open No. 2006-221355 makes a choice about recognition results based on the above-mentioned spatial constraint and fixes one recognition result. Specifically, when having considered that a recognition result fixed with respect to a given time and location is correct, the technique performs the other recognition operations based on the fact that a person recognized in the recognition result was present at the given time and location. Therefore, in a case where the recognition result is erroneous even once, a recognition result which is correct as a whole may become unable to be obtained. For example, in a case where there is a plurality of recognition candidates and, in a given region, there is no candidate having a conspicuously high recognition likelihood, if the recognition candidates are narrowed down based on the idea that a recognition result which does not contradict the above-mentioned spatial constraint is necessarily correct, a recognition result which is correct as a whole becomes unable to be obtained.

SUMMARY

Aspects of the present disclosure are generally directed to, in the case of conducting recognition in a plurality of recognition environments based on the above-mentioned spatial constraint, even if there is no candidate having a conspicuously high recognition likelihood in a given recognition environment, making recognition results in the plurality of recognition environments into appropriate results.

According to an aspect of the present disclosure, an information processing apparatus that recognizes a registered person includes an output unit configured to output information indicating a certainty that a person contained in an image captured in a first region is the registered person, and an updating unit configured to update the information based on a possibility that the registered person is present in a second region different from the first region. According to another aspect of the present disclosure, an information processing apparatus includes an estimation unit configured to estimate, based on a feature of a person of interest contained in an image captured in each of a plurality of regions and a feature of a previously set registered person, a certainty that the person of interest is the registered person, and an updating unit configured to, with respect to a first person of interest subjected to image capturing in a first region out of the plurality of regions, in a case where a period for which a state in which a certainty that a second person of interest contained in an image captured in a second region different from the first region is the registered person is larger than a threshold value is kept is longer than a predetermined period, perform updating in such a way as to lower a certainty that the first person of interest in the first region is the registered person, and, in a case where the period for which the state in which the certainty that the second person of interest is the registered person is larger than the threshold value is kept is shorter than the predetermined period, perform updating in such a way as not to lower the certainty that the first person of interest in the first region is the registered person.

Further features of the present disclosure will become apparent from the following description of exemplary embodiments with reference to the attached drawings.

BRIEF DESCRIPTION OF THE DRAWINGS

FIGS. 4A and 4B are diagrams illustrating examples of captured images with information appended thereto.

FIGS. 5A and 5B are diagrams illustrating examples of results obtained by an extraction unit processing captured images.

FIG. 6 is a diagram illustrating an example of a method of obtaining a person certainty factor.

FIG. 7 is a diagram illustrating an example of a list of feature quantities of respective registered persons.

FIG. 8 is a diagram illustrating an example of a person certainty factor table.

FIGS. 10A, 10B, and 10C are diagrams illustrating examples of area certainty factor tables.

FIGS. 12A and 12B are diagrams illustrating examples of person certainty factor tables.

FIG. 15 is a diagram illustrating an example of a person certainty factor table.

DESCRIPTION OF THE EMBODIMENTS

Various exemplary embodiments, features, and aspects of the disclosure will be described in detail below with reference to the drawings. Furthermore, configurations illustrated in the following exemplary embodiments are merely examples, and the disclosure should not be construed to be limited by the illustrated configurations.

Figure 1:
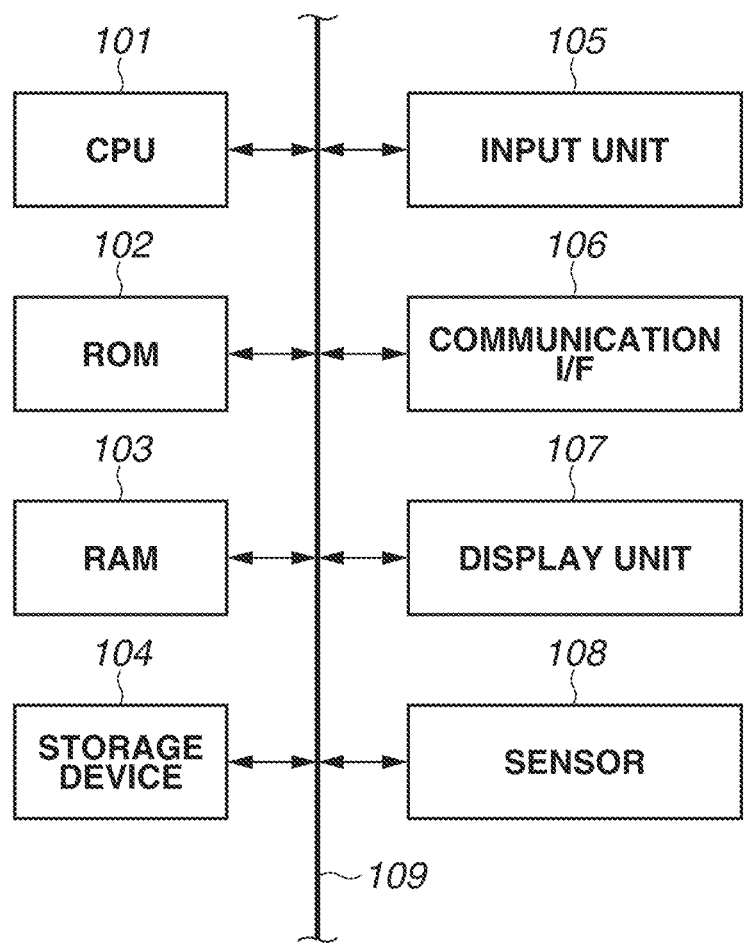
FIG. 1 is a diagram illustrating a hardware configuration example of an information processing system.

FIG. 1 is a diagram illustrating a hardware configuration example of an information processing system according to a first exemplary embodiment. A central processing unit (CPU) 101, which uses a random access memory (RAM) 103 as a work memory, reads out and executes an operating system (OS) and other programs stored in a read-only memory (ROM) 102 and a storage device 104 and thus controls constituent elements connected to a system bus 109 to perform, for example, computation and logical determination for various processing operations. The processing operations which the CPU 101 performs include information processing which is performed in the first exemplary embodiment. The storage device 104, which is, for example, a hard disk drive or an external storage device, stores programs and various pieces of data concerning information processing which is performed in the first exemplary embodiment. An input unit 105 includes an imaging apparatus, such as a camera, and an input device, such as buttons, a keyboard, or a touch panel, used for receiving a user instruction. Furthermore, while the storage device 104 and the input unit 105 are connected to the system bus 109 via an interface such as Serial Advanced Technology Attachment (SATA) and via a serial bus such as Universal Serial Bus (USB), respectively, their details are omitted from description. A communication interface (I/F) 106 performs communication with an external apparatus via wireless communication or wired communication. A display unit 107 is a display. A sensor 108 is an image sensor or distance sensor. The sensor 108 corresponds to an imaging apparatus 11a (FIG. 2A).

Figure 2A:
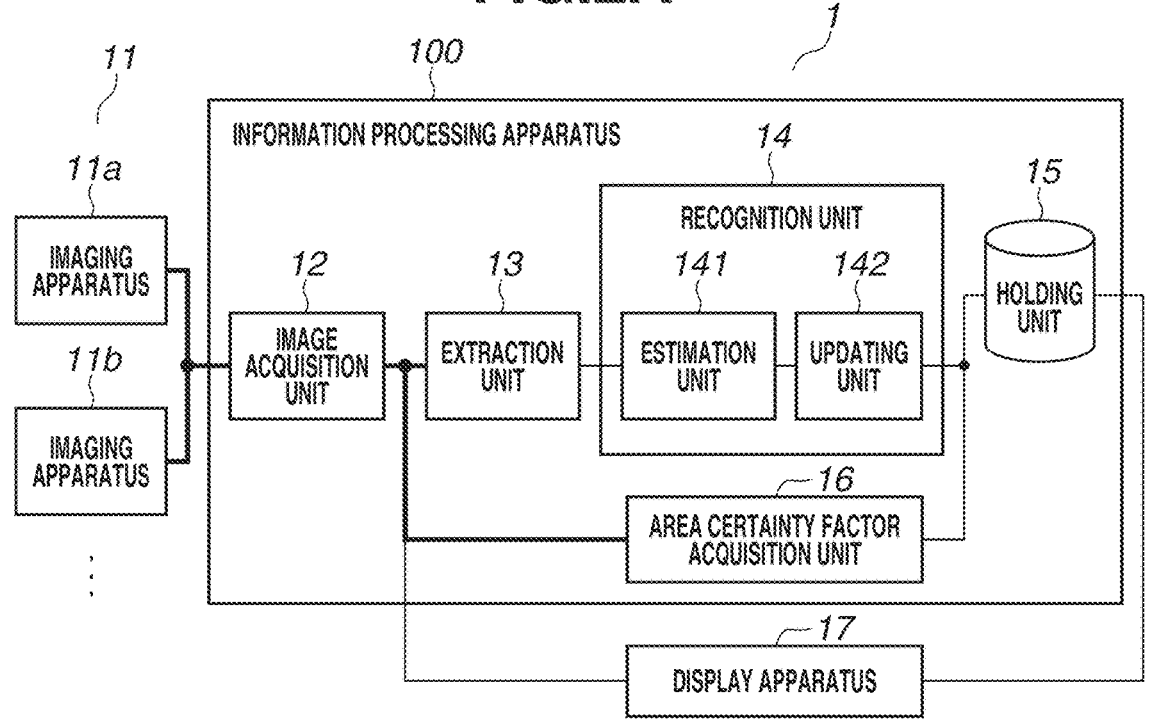
FIGS. 2A and 2B are block diagrams illustrating functional configuration examples of the information processing system.

FIG. 2A is a block diagram illustrating a functional configuration example of an information processing system 1 which is configured to recognize a specific person. An imaging system 11 includes a light receiving sensor configured to monitor the state of an environment and is able to capture a moving image. Hereinafter, in a case where it is necessary to distinguish individual imaging systems 11, the imaging systems 11 are referred to as an imaging apparatus 11a, an imaging apparatus 11b, and so on. Furthermore, regions subjected to image capturing by respective imaging systems 11 are assumed not to overlap each other. Furthermore, the imaging system 11 corresponds to the sensor 108 in the above-mentioned hardware configuration example. Moreover, an imaging system can be included in an information processing apparatus. Each imaging apparatus contains an optical system, such as a lens, and an image sensor, such as a complementary metal-oxide semiconductor (CMOS) sensor or a charge-coupled device (CCD) sensor and, specifically, is a red-green-blue (RGB) color camera.

An information processing apparatus 100 is configured to recognize a specific person from an image. The information processing apparatus 100 includes an image acquisition unit 12, an extraction unit 13, a recognition unit 14, a holding unit 15, and an area certainty factor acquisition unit 16.

The image acquisition unit 12 acquires an image captured by the imaging system 11, which sets a predetermined region as a monitoring target, and outputs the acquired image to the extraction unit 13. In this instance, a camera identifier (ID) and image capturing clock time are appended to the image. For example, a camera ID "a" is appended to an image captured by the imaging apparatus 11a performing image capturing of a first region, and a camera ID "b" is appended to an image captured by the imaging apparatus 11b performing image capturing of a second region. Here, the first region and the second region are assumed to be respective regions existing at a distance from each other by which the monitoring target is unable to move in a moment. Specifically, a constraint in which, in a case where a person is assumed to move at a predetermined speed from the first region to the second region, a predetermined time is required is set as temporal and spatial restraints. Furthermore, while, in the first exemplary embodiment, an example of performing processing on a video image captured in real time by the imaging system 11 is described, similar processing can be performed on a past video image previously recorded. In that case, the image acquisition unit 12 acquires a past image stored by the holding unit 15.

The extraction unit 13 extracts a partial image indicating a feature (partial or overall feature) of the body of one person from an image obtained by the imaging system 11 performing image capturing. Thus, the extraction unit 13 extracts a person candidate region from an image obtained from the image acquisition unit 12, and outputs the extracted person candidate region as a person candidate image. The person candidate region is a region containing a feature indicating a person out of the image. The person candidate image is a partial image having a feature of one person. In a case where a plurality of person candidates is included in an image, the extraction unit 13 acquires person candidate images the number of which corresponds to the number of the plurality of person candidates. Therefore, when there are many person candidates in one image plane, the extraction unit 13 outputs many person candidate images, and, when there is no person candidate found in one image plane, the extraction unit 13 does not perform outputting. Furthermore, information indicating an area ID and image capturing clock time is appended to each person candidate image. Additionally, a camera ID and the position and size of a person candidate region relative to an input captured image are also appended to a person candidate image as needed.

The area ID is position information for identifying an area. The area represents a region of place in which a person candidate is present, and, here, is assumed to be an image capturing region for each camera. In this case, an area ID "a" is appended to an image captured by the imaging apparatus 11a, and an area ID "b" is appended to an image captured by the imaging apparatus 11b. The area ID is associated with the corresponding camera ID.

Next, the following processing is performed by the recognition unit 14 on each person candidate image output by the extraction unit 13. The recognition unit 14 includes an estimation unit 141 and an updating unit 142. In a case where the maximum value of the person certainty factor of a person included in a person candidate image with respect to each registered person is larger than a predetermined threshold value, the recognition unit 14 recognizes that the person included in the person candidate image is a registered person. The person certainty factor to be used here is a value which has been updated based on an area certainty factor described below.

Upon receiving the input person candidate image, the estimation unit (output unit) 141 outputs a person certainty factor (information) indicating a probability that a person included in the person candidate image is a registered person serving as a recognition target, with respect to all of the registered persons. Thus, the estimation unit 141 outputs a person certainty factor for each extracted partial image. Details of this processing are described below. For example, in a case where there are 100 registered persons, the estimation unit 141 acquires 100 person certainty factors. Here, the person certainty factor is assumed to be a numerical value expressed by a real number of [0, 1], which is "0" in a case where it is certain that the person included in the person candidate image is not a corresponding registered person and is "1" in a case where it is certain that the person included in the person candidate image is a corresponding registered person. In other words, the estimation unit 141 calculates a degree of similarity between a person contained in an image captured by a monitoring camera and a corresponding registered person.

The updating unit 142 refers to an area certainty factor (region information) stored by the holding unit 15 and updates a person certainty factor obtained from the estimation unit 141 with use of temporal and spatial constraints. In other words, the updating unit 142 updates, based on a probability that a registered person is present in a second region different from a first region, a person certainty factor (information) indicating a probability that a person included in a person candidate image is a registered person serving as a recognition target. Here, the updating unit 142 updates the person certainty factor based on the following two assumptions. The first assumption is that, if the person has been present in the second region at time t−1, the probability that the person is present in the first region at time t is low. The second assumption is that, if the person has been present in the first region at time t−1, the probability that the person is present in the first region at time t is high. The updated person certainty factor is stored in the holding unit 15. Furthermore, the area certainty factor (region information) is a numerical value indicating a probability that a given person is present in a given area, and details thereof are described below.

When the person certainty factor has been estimated by the recognition unit 14 with respect to all of the person candidate images output by the extraction unit 13, the area certainty factor acquisition unit 16 updates the area certainty factor (information) based on the person certainty factor. Details of the processing are described below. The updated area certainty factor is stored in the holding unit 15.

A display apparatus 17 refers to a person certainty factor stored by the holding unit 15 and performs displaying corresponding to a purpose of the system. For example, the display apparatus 17 displays, for example, a detected person frame or person name in superimposition on a captured image output by the image acquisition unit 12. Furthermore, a configuration in which the information processing apparatus 100 includes a display unit can be employed. Moreover, instead of a display apparatus, another type of apparatus which is capable of presenting a recognition result to the user, for example, a sound generation apparatus, can be employed.

In the following description, the information processing system 1 is described in more detail with an example.

Furthermore, while the number of imaging apparatuses included in the imaging system 11 can be any number, here, a case where the number of imaging apparatuses is two is described. The imaging apparatus 11a and the imaging apparatus 11b are performing image capturing of respective regions which do no overlap each other. For example, the imaging apparatus 11a is assumed to perform image capturing of the entirety of a room "a", and the imaging apparatus 11b is assumed to perform image capturing of the entirety of a room "b". Moreover, a region of which the imaging apparatus 11a is performing image capturing is assumed to be an area "a", and a region of which the imaging apparatus 11b is performing image capturing is assumed to be an area "b". In this case, the area "a" and the area "b" do not overlap each other.

Figure 3A:
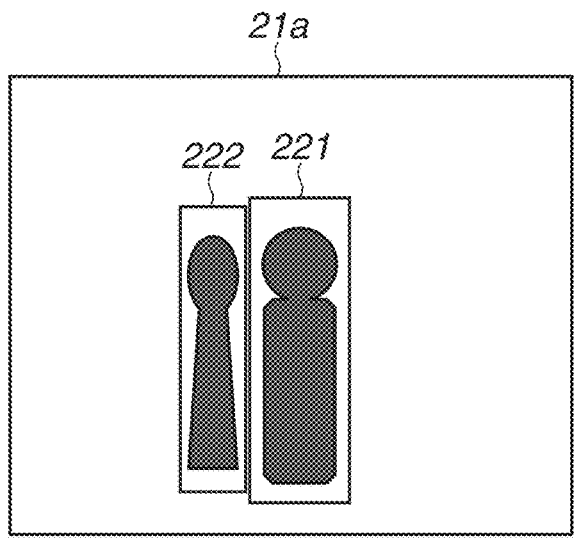
FIGS. 3A, 3B, and 3C are diagrams illustrating examples of images captured by imaging apparatuses.
Figure 3B:
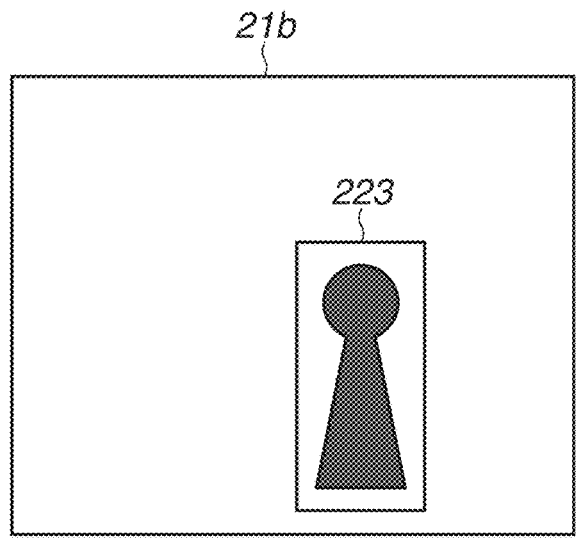

FIGS. 3A and 3B illustrate images captured by the imaging apparatus 11a and the imaging apparatus 11b, respectively, at time t1. FIG. 3A illustrates a captured image 21a captured by the imaging apparatus 11a, and FIG. 3B illustrates a captured image 21b captured by the imaging apparatus 11b. The captured image 21a contains images of two persons, and the captured image 21b contains an image of one person. A camera ID and image capturing clock time are appended to each of the captured image 21a and the captured image 21b by the image acquisition unit 12. Moreover, in the first exemplary embodiment, to distinguish input images, an input image ID is also appended to each of the captured image 21a and the captured image 21b. FIG. 4A illustrates the captured image 21a and the captured image 21b having these pieces of information appended thereto. When required, information about, for example, the size of a captured image can be additionally appended.

The extraction unit 13 acquires captured images 21 from the image acquisition unit 12, and extracts person candidate images (partial images) containing features of persons. This operation can be performed by detecting person candidate regions seemed to be persons from the captured images 21 and clipping images of the detected person candidate regions. The detected person candidate regions include three regions 221, 222, and 223, which contain images of Mr. A, Mr. B, and Mr. C, respectively. For example, the method of extracting a person candidate region integrates pixels similar in pixel level. The method gradually integrates the pixels until one region is formed from the integrated pixels, determines the likelihood of being a person with respect to a bounding box of a portion formed as one region in each level, and narrows down candidates, thus extracting a person candidate region. Furthermore, the method of extracting a person candidate region is not limited to this, and a method of extracting a region in which a person can be present with use of deep learning can be employed.

FIG. 5A illustrates results obtained by the extraction unit 13 processing the captured image 21a and the captured image 21b. Next, with respect to each person candidate image output by the extraction unit 13, the estimation unit 141 acquires, for each person which is previously registered, a person certainty factor, which indicates the level of the certainty of being the registered person, as multivalued information in the range of (0, 1). The acquired result is stored in the holding unit 15. Furthermore, here, the person certainty factor is set not to include 0 and 1. This is for the purpose of avoiding fixing a recognition result for a person by determination performed only by an apparatus. If a recognition result obtained by an information processing apparatus becomes erroneous once at a certain point of time, an erroneous influence may be imposed on the subsequent processing results. The first exemplary embodiment is directed to preventing or reducing an influence of such erroneous recognition and finally obtaining a correct recognition result. Furthermore, fixing a recognition result enables stabilizing the processing and reducing a processing load. For example, at timing when the user has checked a recognition result, if the recognition result is correct, the person certainty factor can be set to 1. As another method of estimating a person certainty factor, the estimation unit 141 performs estimation of the person certainty factor with use of a learned model. For example, past recognition results and video images captured by current monitoring cameras are input to the learned model. The learned model can be used to estimate, with respect to a person contained in a given image, a person certainty factor about the person based on a recognition result and the timing of detection thereof.

Furthermore, while the method of obtaining a person certainty factor is a well-known technique in the field of person recognition, here, an example thereof is described with reference to FIG. 6. Furthermore, the present exemplary embodiment does not limit the method of obtaining a person certainty factor. Therefore, methods other than the method described here can be used.

Upon receiving a person candidate image E31, feature quantity acquisition P31 acquires a feature quantity, which is a value (normally, a vector) characterizing a person. Usually, in a case where persons contained in person candidate images are the same person, the feature quantities thereof take close values without being affected by conditions such as directions, postures, and illuminations. On the other hand, in a case where the persons are different persons, the feature quantities thereof take substantially different values. The method of acquiring a feature quantity is a well-known technique in the field of person recognition, and details thereof are, therefore, omitted from description. For example, in deep neural networking, for example, cellular neural network (CNN) is used to acquire a feature quantity by combining convolution operation and pooling.

On the other hand, the feature quantity acquisition P31 is previously performed on images containing respective registered persons and the feature quantities thereof are previously acquired. The feature quantities acquired in this way are collected as feature quantities (registered persons) E32 together with person IDs for identifying the respective registered persons. FIG. 7 illustrates an example of a feature quantity (registered person) table obtained by listing the feature quantities (registered persons) E32.

The feature quantity acquired by the feature quantity acquisition P31 is compared with each feature quantity of the feature quantities (registered persons) E32 by degree-of-similarity calculation P32, so that a person certainty factor E33 with respect to each registered person is acquired. The method of acquiring a person certainty factor is not particularly limited, and, for example, a cosine degree of similarity between feature quantity vectors (negative values being set to 0) or a power of a constant (positive number less than 1) with a Euclidean distance between feature quantity vectors set as a power index can be used.

The acquired person certainty factor E33 is put together with an output of the extraction unit 13 and is then stored as a person certainty factor table in the holding unit 15. FIG. 8 illustrates an example of the person certainty factor table. In terms of a record the person candidate image ID of which is 1-1, despite that the target image is an image obtained by performing image capturing of Mr. A, the person certainty factor of Mr. B has been calculated as being slightly higher than that of Mr. A. This means that false recognition of persons has occurred.

The updating unit 142 corrects the person certainty factor acquired by the estimation unit 141 with use of area certainty factors of the respective registered persons obtained immediately before the acquisition. Assuming that the time at which the imaging apparatus 11 started image capturing is t1, immediately preceding area certainty factors are not yet acquired. While, in a case where immediately preceding area certainty factors are not yet acquired, the area certainty factors are treated as 0, in the first exemplary embodiment, as a result, the person certainty factor is not corrected by the updating unit 142. Details of the operation of the updating unit 142 are described below in the description of the operation performed at time t2.

While the person certainty factor table stored by the holding unit 15 is updated with the corrected person certainty factor, the person certainty factor table obtained at time t1 is unchanged from that illustrated in FIG. 8. When, with respect to all of the person candidate images output by the extraction unit 13, the recognition unit 14 has acquired person certainty factors of the respective registered persons, the area certainty factor acquisition unit 16 acquires area certainty factors of the respective registered persons. Thus, the area certainty factor acquisition unit 16 acquires an area certainty factor indicating a probability that each registered person is present in each of a plurality of regions.

The area certainty factor represents the degree to which a given person seems to be present in a given area, and, here is assumed to be a numerical value expressed by a real number of [0, 1], which is "0" in a case where it is certain that the person is not present and is "1" in a case where it is certain that the person is present. As a method of acquiring an area certainty factor, for example, a weighted average between the maximum value of person certainty factors of the target person and the immediately preceding area certainty factor with respect to all of the person candidate images present in the target area can be used.

$$\text{Area certainty factor} = (\text{person certainty factor of the target person}) \times s + (\text{immediately preceding area certainty factor}) \times (1-s) \qquad (1)$$

In formula (1), $0 < s \leq 1$ is specified. The "person certainty factor of the target person" is calculated from a captured image obtained at the target time. On the other hand, the "immediately preceding area certainty factor" includes information obtained before that time. If the certainty factor acquired from one image is absolute, $s=1$ is used. However, since there is occlusion (hiding) of a person (in this case, since a person disappears, typically, $s=0$ is used) or there is a fluctuation of certainty factor caused by images, weighting is performed for the purpose of also considering somewhat preceding information. This method causes values in a temporal direction to be taken into consideration. Methods other than a weighted average can also be employed. The value $s$ is, here, a fixed constant, but can be a variable depending on cases.

Referring to FIG. 8, person candidate images in an area the area ID of which is "a" are two images the person candidate image IDs of which are 1-1 and 1-2, and the respective person certainty factors of Mr. A are 0.73 and 0.23. Then, the maximum value of person certainty factors of Mr. A with respect to each registered person is taken. The maximum value of 0.73 and 0.23 is found to be 0.73. If $s=0.7$ is set, the area certainty factor in the area "a" of Mr. A at time t1 becomes $0.73 \times 0.7 = 0.51$.

Similarly, the area certainty factor in the area "b" of Mr. A at time t1 becomes 0.29×0.7=0.20. In this way, the area certainty factor acquisition unit 16 acquires area certainty factors with respect to all of the areas.

Moreover, the area certainty factor acquisition unit 16 also performs updating of an other-area certainty factor. The other-area certainty factor is a degree to which a given person seems to be present outside an area of interest. For example, in a case where there are n cameras, in other words, there are n areas, the other-area certainty factor in the area "a" can be set as the maximum value of area certainty factors in areas other than the area "a". Alternatively, the other-area certainty factor in the area "a" can be set as "1−area certainty factor".

For example, the other-area certainty factor in an area the area ID of which is "a" is assumed to be the maximum value of area certainty factors of Mr. A in areas other than the area the area ID of which is "a". In the first exemplary embodiment, since areas other than the area the area ID of which is "a" include only an area the area ID of which is "b", 0.20 is obtained. This is the other-area certainty factor in the area "a" of Mr. A at time t1.

FIG. 10A illustrates area certainty factors and other-area certainty factors acquired in the above-described way with respect to all of the areas. The acquired area certainty factors and other-area certainty factors are stored as an area certainty factor table by the holding unit 15. Furthermore, while clock time information is also included in the table illustrated in FIG. 10A, since, in the first exemplary embodiment, only the latest area certainty factors are to be used, clock time information does not necessarily need to be stored.

According to the above-described processing, with respect to each person candidate contained in an image captured by the imaging system 11, a person certainty factor is acquired for each registered person. While, in the first exemplary embodiment, how to use the acquired person certainty factor is not particularly specified, here, an example of an operation which displays a detection frame and name of the detected person in superimposition on a captured image is described.

Figure 9:
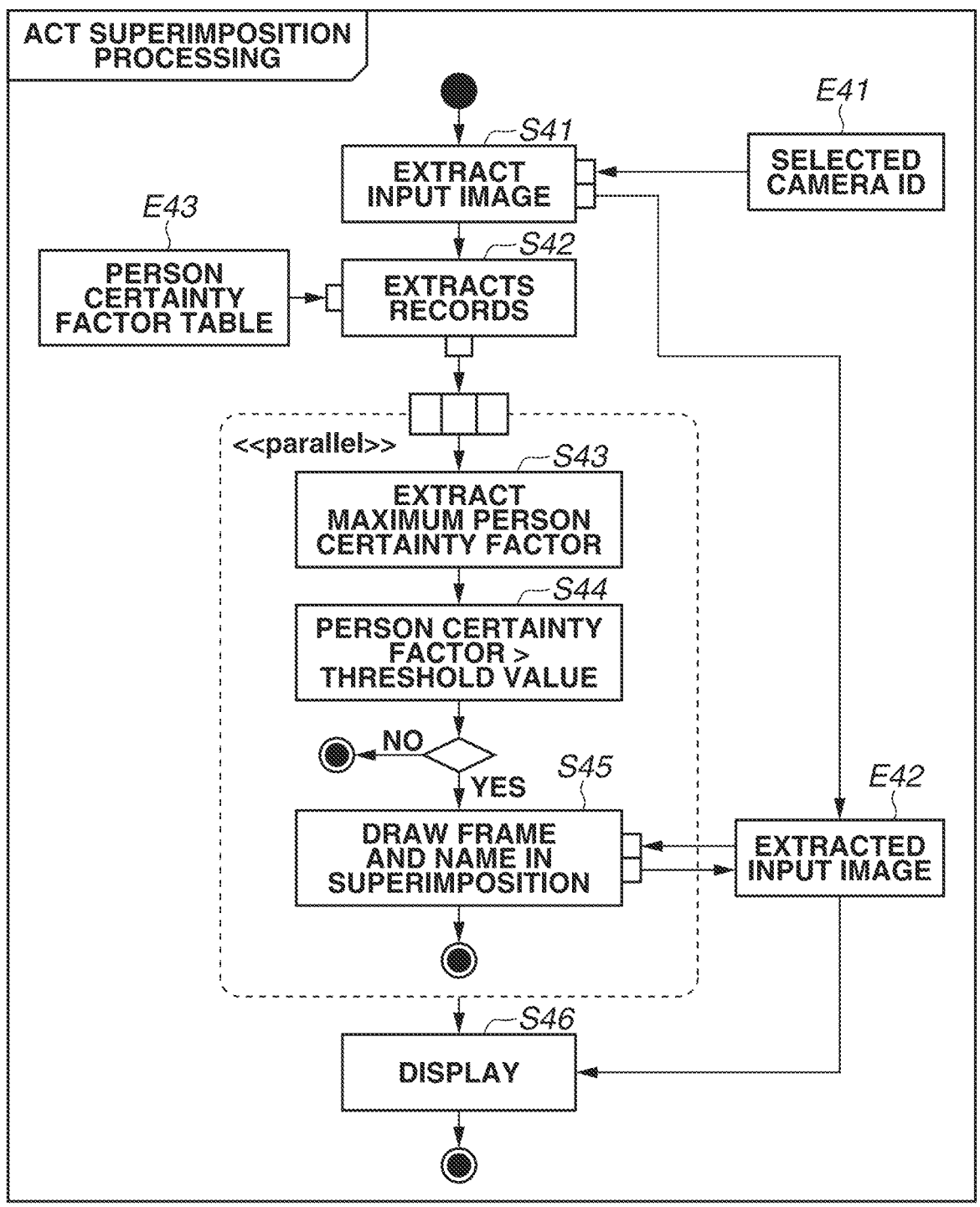
FIG. 9 is a flowchart illustrating processing which a display apparatus performs.

FIG. 9 is a flowchart illustrating processing which the display apparatus 17 performs. The display apparatus 17 specifies a camera ID (E41) selected from the camera IDs of cameras for use in image capturing. In step S41, the display apparatus 17 extracts, from outputs of the image acquisition unit 12, an input image corresponding to the selected camera ID (E41).

Here, suppose that the selected camera ID (E41) is "a". Then, a left-hand input image illustrated in FIG. 4A is extracted as the extracted input image E42.

Next, in step S42, the display apparatus 17 extracts records of person candidate images from a person certainty factor table E43. The input image ID of the extracted input image E42 is "a1". Then, the display apparatus 17 extracts records the input image ID of which is "a" from the person certainty factor table E43, which is illustrated in FIG. 8. The result of extraction includes records the person candidate image IDs of which are 1-1 and 1-2 as illustrated in FIG. 8.

The display apparatus 17 performs processing in step S43 to step S45 on each of the extracted records. While simultaneous parallel processing can be performed on the respective extracted records, here, description focuses on the record the person candidate image ID of which is 1-1.

First, in step S43, with respect to a person detected from the image, the display apparatus 17 extracts the maximum person certainty factor from person certainty factors indicating the degree of similarity to respective registered persons. Here, "0.75" of "Mr. A" is extracted. Next, in step S44, the display apparatus 17 determines whether "0.75", which is the maximum value of the person certainty factors, is greater than a predetermined threshold value. Here, the threshold value is assumed to be 0.6. In this case, since a relationship of 0.75>0.6 is found (YES in step S44), the display apparatus 17 advances the processing to step S45. If the maximum person certainty factor is less than or equal to the threshold value (NO in step S44), the display apparatus 17 ends the processing with doing nothing on this record.

In step S45, the display apparatus 17 draws a person detection frame and a name in superimposition on the extracted input image E42 (an input image the input image ID of which is "a1"). The person detection frame is expressed by the position and size of a record. The display apparatus 17 also performs similar processing on a record the person candidate image ID of which is 1-2. As a result, a person detection frame for "Mr. C" is drawn in superimposition. When completing processing in step S43 to step S45 on all of the records extracted in step S42, then in step S46, the display apparatus 17 displays, on a display (not illustrated), the input image E42 with the drawn person detection frames and names superimposed thereon.

Figure 11A:
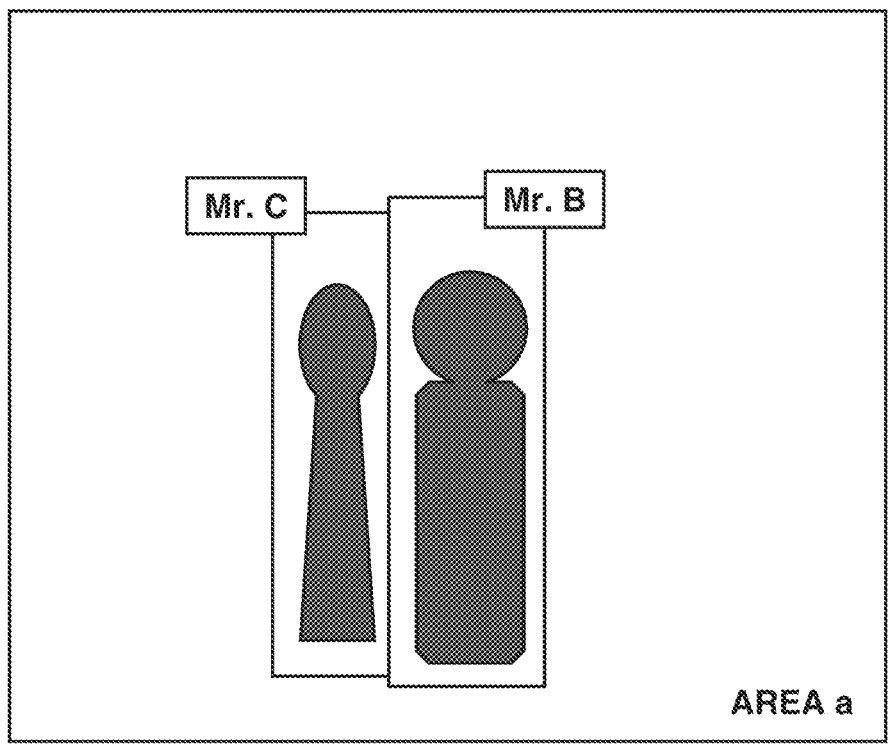
FIGS. 11A and 11B are diagrams illustrating examples of images displayed by the display apparatus.

FIG. 11A illustrates an example of the image displayed by the display apparatus 17. At this stage, Mr. A has been erroneously recognized as Mr. B. Furthermore, for example, the method of displaying a detection frame and the method of displaying a corresponding person name can be methods other than the methods used in the first exemplary embodiment.

Next, a case where images captured by the imaging apparatuses 11 at time t2 are processed is described. Furthermore, time t2 is timing at which image capturing is performed immediately after time t1, and t2−t1 is a time interval which is sufficiently short as compared with a movement between areas "a" and "b" of a person. Here, description focuses on portions different from those described with regard to time t1.

Figure 3C:
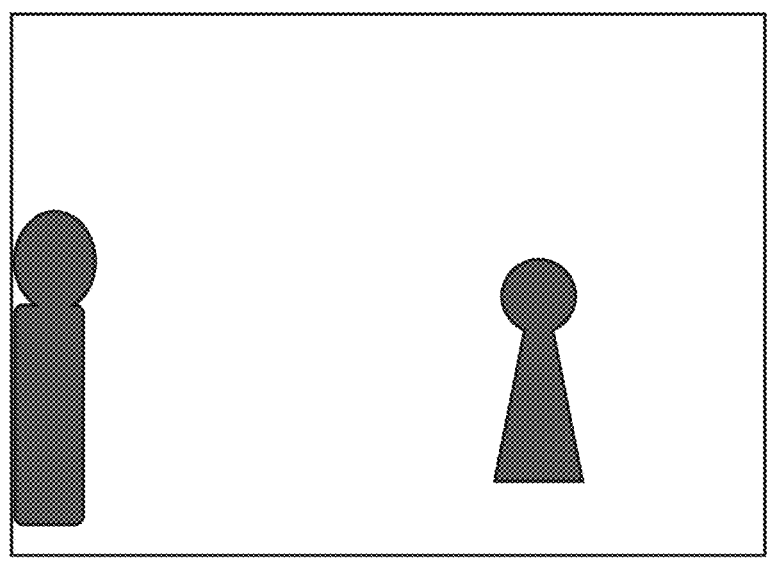

Suppose that, as another person (Mr. B) has entered an image capturing region of the imaging apparatus 11b, a captured image such as that illustrated in FIG. 3C has been obtained. At this time, an input image which is output from the image acquisition unit 12 becomes an image such as an image the input image ID of which is "b2" illustrated in FIG. 4B. Here, for ease of explanation, suppose that there is no change in an image captured by the imaging apparatus 11a and there is no change in an image captured by the imaging apparatus 11b except that Mr. B, who is a new person, is additionally contained in the captured image.

Then, person candidate images which the extraction unit 13 outputs become images such as those illustrated in FIG. 5B. Additionally, FIG. 12A illustrates a person certainty factor table which is obtained as a result of processing performed by the estimation unit 141 on the respective person candidate images.

Next, the updating unit 142 updates the person certainty factors of the respective person candidate images in the person certainty factor table. The updating unit 142 corrects a person certainty factor in such a way as to:

increase the person certainty factor if the person candidate image has been present in the same area at the last minute (Assumption 1); and decrease the person certainty factor if the person candidate image has been present in another area at the last minute (Assumption 2).

These assumptions are respectively equivalent to "a person who has been present in an area at a certain point of time will be present in the same area even at a next point of time" and "a person who has been present in another area at a certain point of time will not be present in this area even at a next point of time". For example, these can be implemented by performing the following operations.

$$\text{Person certainty factor1=person certainty factor0+ area certainty factor } \hat{\ }m \times (1-\text{person certainty factor0}) \times R \quad (2)$$

$$\text{Person certainty factor2=person certainty factor1} \times (1-\text{other-area certainty factor } \hat{\ }n) \quad (3)$$

In formulae (2) and (3), $1 \leq m$, $0 < R < 1$, and $1 \leq n$ are specified.

Figure 13A:
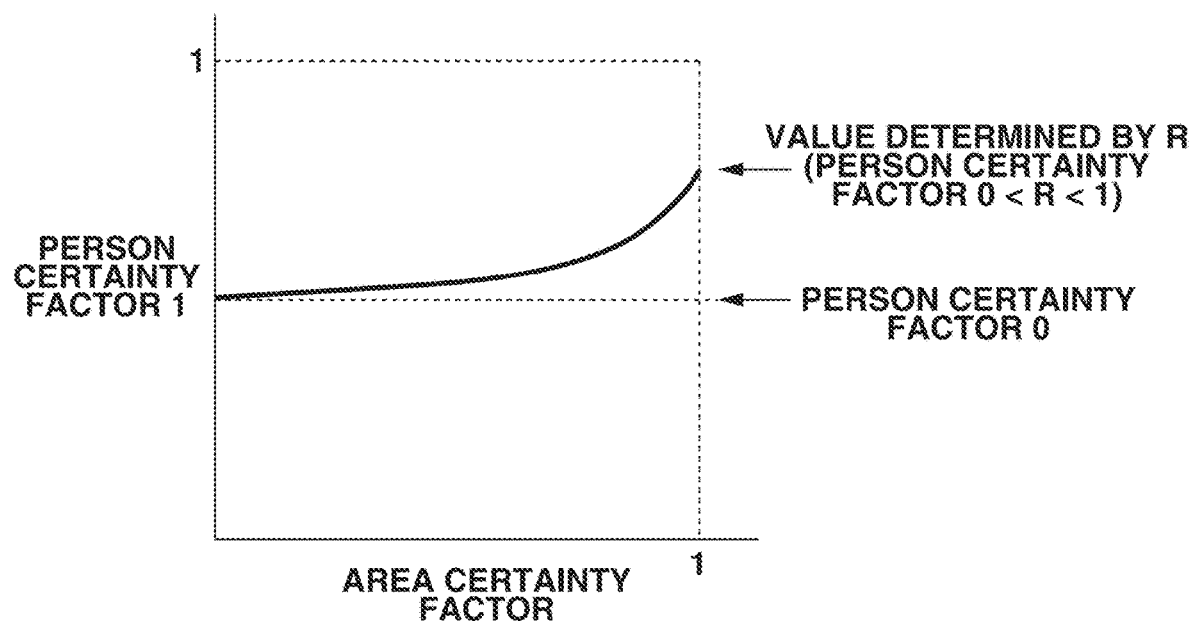
FIGS. 13A and 13B are diagrams illustrating examples of transitions of person certainty factors.
Figure 13B:
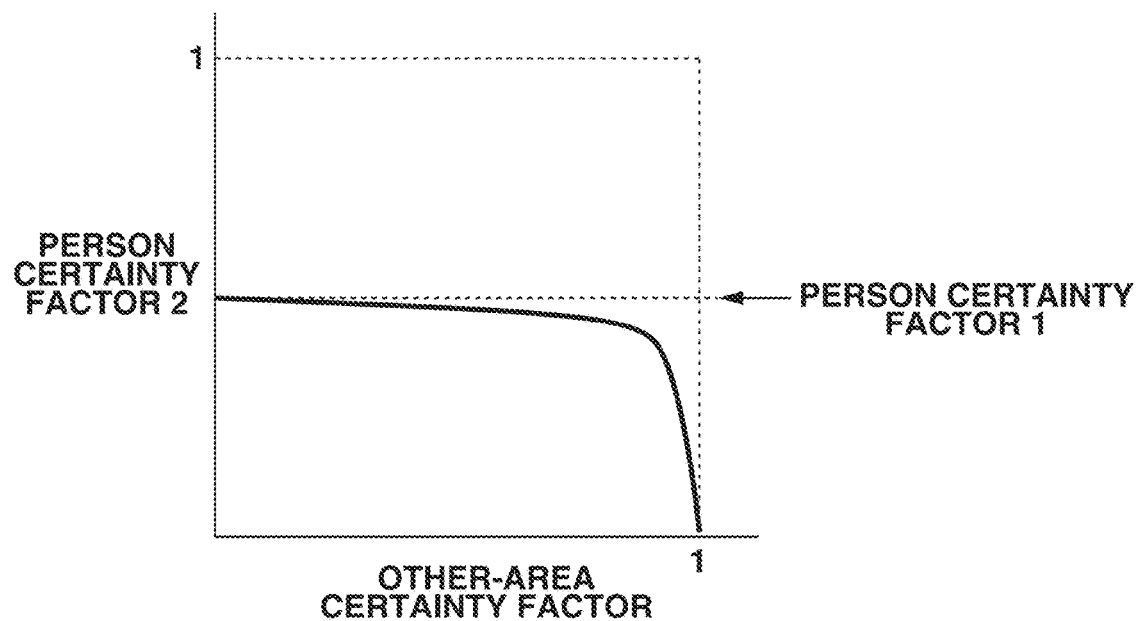

Furthermore, R is a value indicating to which value to set the person certainty factor 1 in a case where the area certainty factor is 1. Moreover, m and n denote curves in graphs. For example, in the case of m=1, a line in the graph illustrated in FIG. 13A becomes a straight line. Moreover, in the case of 1<m, the line becomes a downward convex line, and, as m becomes larger, the degree of convexity becomes larger (the line becomes closer to the horizontal axis and vertical axis). The same also applies to n, and is illustrated in FIG. 13B. In the case of n=1, a line in the graph illustrated in FIG. 13B becomes a straight line, and, in the case of 1<n, the line becomes an upward convex line, and, as n becomes larger, the degree of convexity becomes larger. Optimum values are determined as values R, m, and n by conducting observations in advance. Sign "^" denotes a power, and "A^k" is assumed to represent "A to the power of k".

Moreover, the person certainty factor 0 is a person certainty factor obtained before being corrected by the updating unit 142, and the person certainty factor 2 is a person certainty factor obtained after being corrected thereby. Formula (2) is a formula corresponding to Assumption 1, in which the person certainty factor 1 takes a value between the person certainty factor 0 and 1 depending on the value of the area certainty factor. Formula (3) is a formula corresponding to Assumption 2, in which the person certainty factor 2 takes a value between 0 and the person certainty factor 1 depending on the value of the other-area certainty factor.

Figure 14:
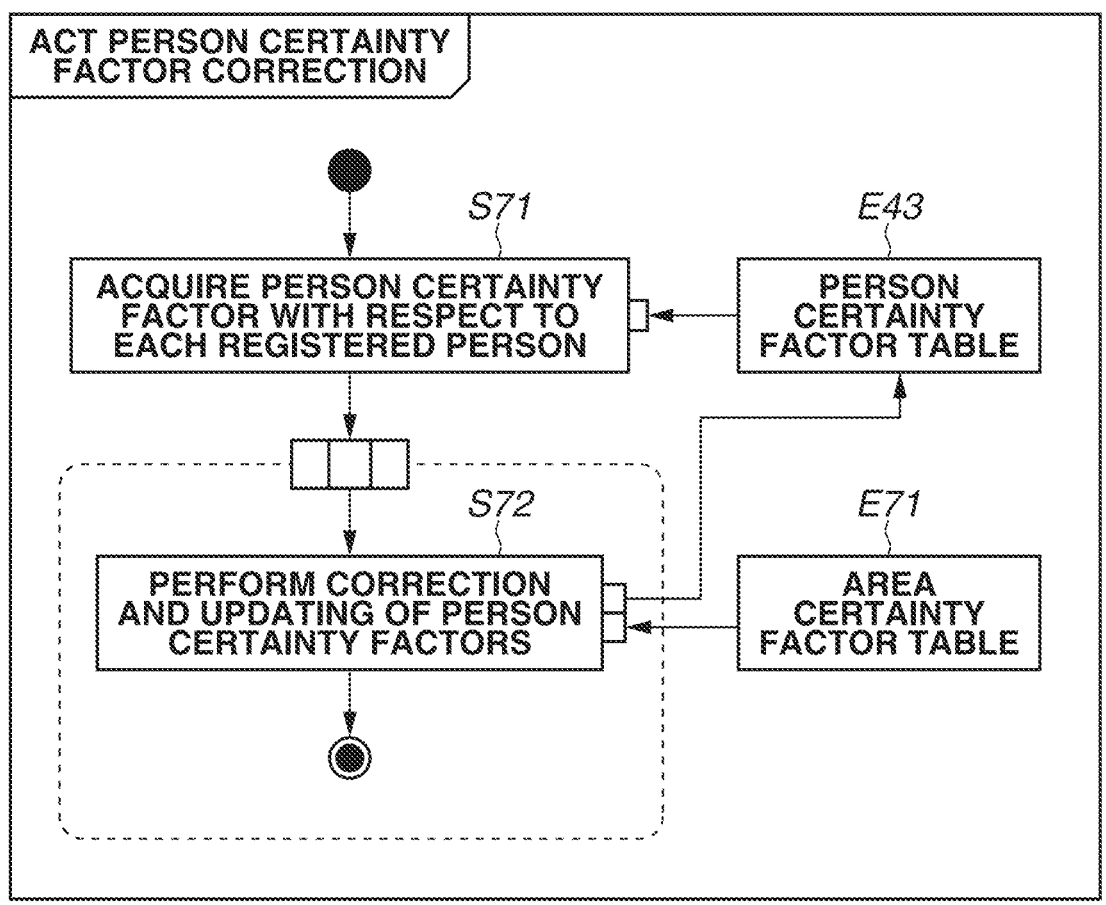
FIG. 14 is a flowchart illustrating processing which an updating unit performs.

FIG. 13 illustrates how the person certainty factor 0 is corrected into the person certainty factor 2 according to formula (2) and formula (3). An operation of the updating unit 142 according to the first exemplary embodiment is described with reference to FIG. 14. First, processing to be performed on a record the person candidate image ID of which is 2-1 is described.

In step S71, the updating unit 142 acquires, from the person certainty factor table E43, a person certainty factor of each target person (a person contained in each person candidate image) with respect to each registered person. For example, since target persons indicated by the person candidate image ID "2-1" are Mr. A, Mr. B, and Mr. C, the updating unit 142 acquires their respective person certainty factors 0.73, 0.75, and 0.23 from the person certainty factor table illustrated in FIG. 12A.

In step S72, the updating unit 142 performs correction and updating of person certainty factors of each target person. For example, assuming that m=10, n=6, and R=0.5 are specified, with regard to the person certainty factor of Mr. A, in reference to the area certainty factor table E71 illustrated in FIG. 10A, the person certainty factor 1 becomes as follows according to formula (2).

$$0.73+0.51\hat{\ }10 \times (1-0.73) \times 0.5 = 0.73$$

When this is applied to formula (3), the person certainty factor 2 becomes as follows.

$$0.73 \times (1-0.20\hat{\ }6)=0.73$$

Then, the updating unit 142 performs correction and updating of the person certainty factor of Mr. A in a record the person candidate image ID of which in the person certainty factor table is 2-1 from 0.73 to 0.73. FIG. 12B illustrates a person certainty factor table E43 in which the person certainty factors have been updated with respect to all of the person candidate images in the above-described way.

Next, the area certainty factor acquisition unit 16 acquires area certainty factors and other-area certainty factors and then updates the area certainty factor table E71. FIG. 10B illustrates the updated area certainty factor table. Assuming that s=0.7 is specified, the area certainty factor in the area "a" of Mr. A at time t2 becomes as follows in reference to the tables illustrated in FIG. 10A and FIG. 12B with use of formula (1).

$$0.73 \times 0.7+0.51 \times (1-0.7)=0.66$$

Figure 11B:
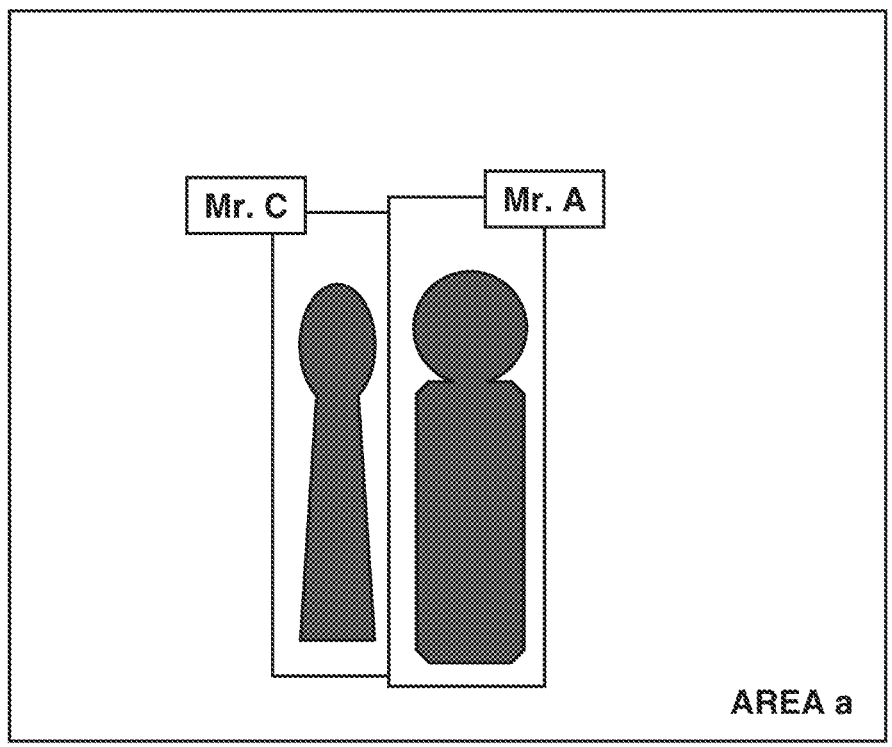

FIG. 10B illustrates the updated area certainty factor table E71. An example of the image displayed by the display apparatus 17 stays unchanged from the image illustrated in FIG. 11A, so that Mr. A has been erroneously recognized as Mr. B. Processing further proceeds at time t3, time t4, . . . , and the person certainty factor table obtained at time t20 is illustrated in FIG. 15 and the area certainty factor table obtained at time t20 is illustrated in FIG. 10C. An example of the image displayed by the display apparatus 17 at time t20 is illustrated in FIG. 11B. It can be seen that the target person has been correctly recognized as Mr. A.

Figure 16:
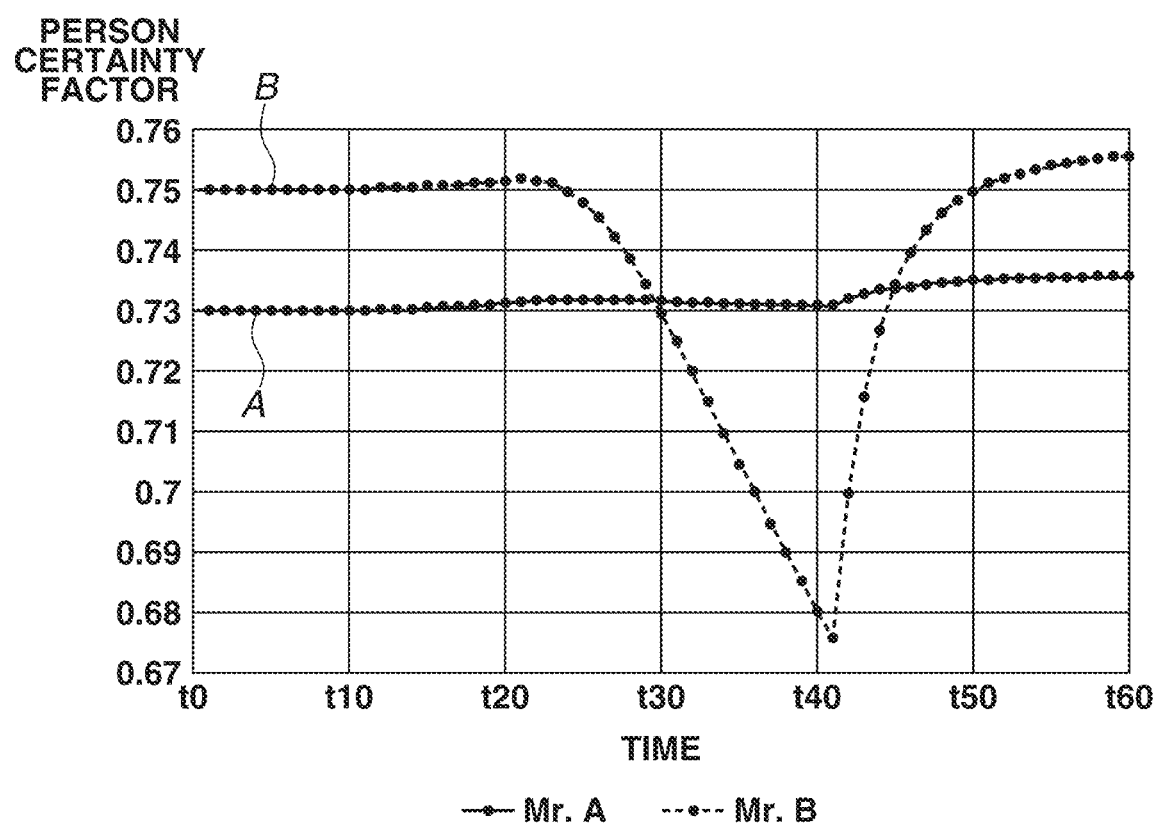
FIG. 16 is a diagram illustrating an example of a transition of a person certainty factor.

FIG. 16 illustrates a graph obtained by plotting transitions of person certainty factors of Mr. A and Mr. B with respect to a person in the person candidate region 221 from time t1 to time t60. Furthermore, the image captured by the imaging apparatus 11*a* during a period from time t1 to time t60 is an image illustrated in FIG. 3A, and the image captured by the imaging apparatus 11*b* during a period from time t1 to time t20 and during a period from time t41 to time t60 is an image illustrated in FIG. 3B and the image captured by the imaging apparatus 11*b* during a period from time t21 to time t40 is an image illustrated in FIG. 3C. Moreover, the above calculation is performed assuming that s=0.1, m=10, n=6, and R=0.5 are specified.

As can be seen from FIG. 16, when Mr. B appears in another area (at time t20), the person certainty factor of Mr. B begins to decrease. Moreover, when Mr. B disappears from another area (at time t40), the person certainty factor of Mr. B begins to increase.

Figure 17A:
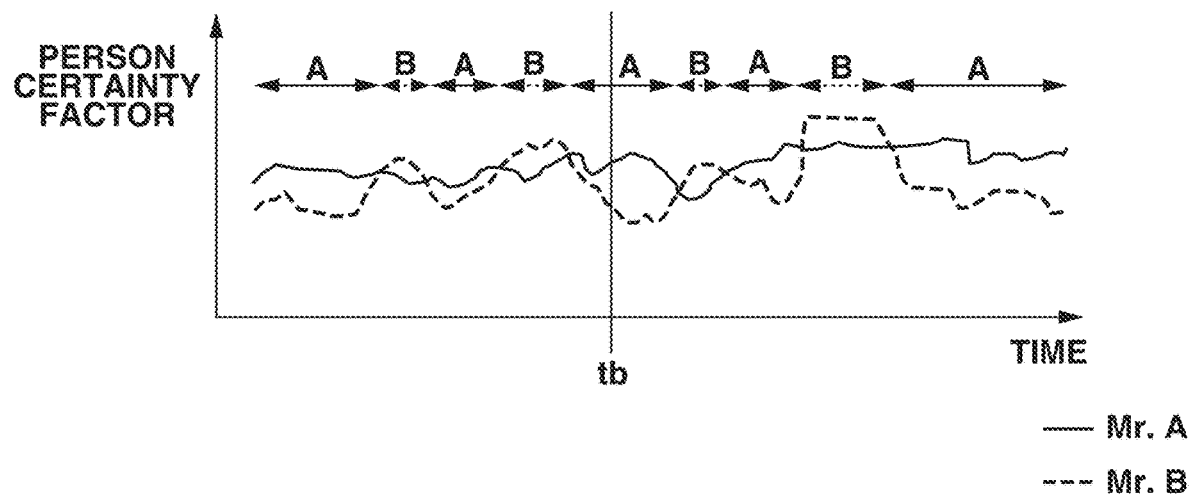
FIGS. 17A and 17B are diagrams illustrating examples of transitions of person certainty factors.
Figure 17B:
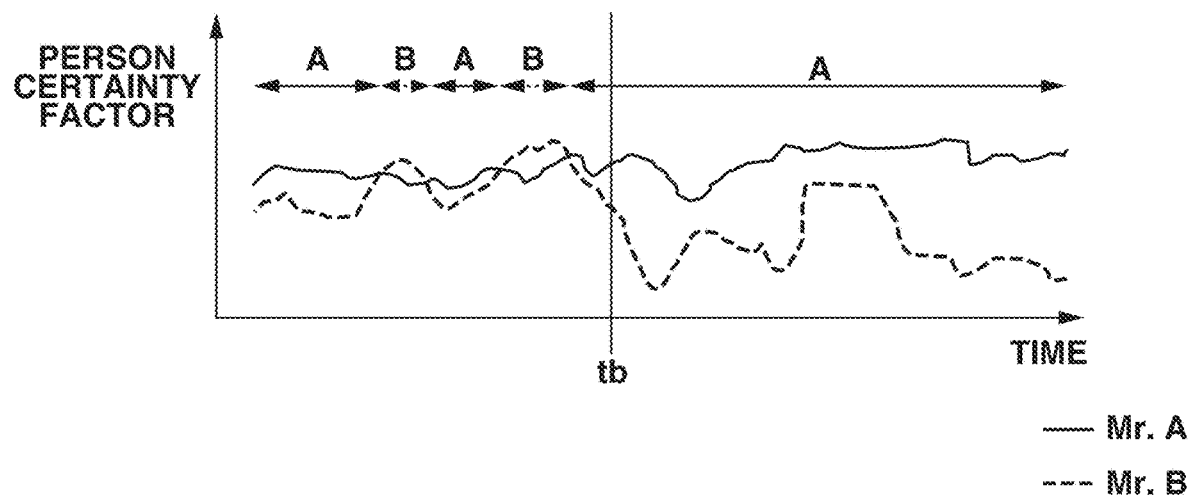

FIGS. 17A and 17B illustrates graphs schematically created in such a way as to make advantageous effects of the first exemplary embodiment readily understandable. These graphs are obtained by plotting, along with time passage, person certainty factors of Mr. A and Mr. B in a person candidate image extracted from a given area. The solid line indicates person certainty factors of Mr. A, and the dashed line indicates person certainty factors of Mr. B. These graphs correspond to a condition in which, at time tb, Mr. B has appeared in an area different from the given area for the person candidate image.

Moreover, at the upper portion of each graph, ranges defined by double arrows and letters "A" and "B" are shown, and these represent a result of recognition of the person candidate image. FIG. 17A illustrates a graph obtained before application of the first exemplary embodiment, and FIG. 17B illustrates a graph obtained after application of the first exemplary embodiment. In the graph obtained before application of the first exemplary embodiment, it can be seen that the result of recognition is fluctuating between Mr. A and Mr. B. However, in the graph obtained after application of the first exemplary embodiment, after Mr. B has appeared in another area at time tb, the result of recognition continues being stable with Mr. A.

As described above, according to the implementation of the first exemplary embodiment, in the case of conducting recognition in a plurality of recognition environments based on the above-mentioned spatial constraint, even if there is no candidate having a conspicuously high recognition likelihood in a given recognition environment, recognition results in the plurality of recognition environments can be made into appropriate results. Furthermore, while the manners of a decrease and an increase of a person certainty factor depend on formulae (1) to (3), in the first exemplary embodiment, the definition of the formulae is out of the domain.

Moreover, while, in the first exemplary embodiment, displaying by the display apparatus 17 is performed based on the person certainty factors, since the first exemplary embodiment is characterized by acquiring person certainty factors, other types of processing can be performed based on the person certainty factors. Examples of the other types of processing include person tracking.

Moreover, in the first exemplary embodiment, after the estimation unit 141 has performed processing on all of the person candidate images, the updating unit 142 corrects person certainty factors. However, the estimation unit 141 and the updating unit 142 can perform respective processing operations on one person candidate image and then perform these processing operations on all of the person candidate images in sequence. Moreover, the estimation unit 141 and the updating unit 142 can perform respective processing operations, which are to be performed on one person candidate image, on all of the person candidate images in parallel.

Moreover, in the first exemplary embodiment, the extraction unit 13 extracts a person candidate image and the feature quantity acquisition P31 acquires a feature quantity characterizing a person. However, the feature quantity of a face can be used as the feature quantity characterizing a person. For example, a face region is further extracted from the person candidate image, and a face feature quantity is acquired from the face region. This face feature quantity can be used as the feature quantity characterizing a person. Alternatively, instead of the person candidate image, a face candidate image is extracted and a face feature quantity is acquired from the face candidate image, so that this face feature quantity can be used as the feature quantity characterizing a person.

While, in the first exemplary embodiment, a system in which two cameras are used to monitor separate distant locations is described, a system capable of monitoring different regions only needs to be employed. For example, a configuration in which a single camera is configured to swivel to monitor a plurality of regions can also be employed. In this case, since a person is able to move between regions in a short amount of time, relaxing a spatial constraint can be employed.

Additionally, only in a case where a certainty that a given person of interest is a registered person takes a value larger than a threshold value for a time longer than a predetermined period, the updating unit 142 can be configured to update a certainty that a person of interest other than the given person of interest is a registered person. Specifically, with respect to a first person of interest subjected to image capturing in a first region out of a plurality of regions, in a case where a period for which a state in which a certainty that a second person of interest contained in an image captured in a second region different from the first region is the registered person is larger than a threshold value is kept is longer than a predetermined period, the updating unit 142 performs updating in such a way as to lower a certainty that the first person of interest in the first region is the registered person. Moreover, in a case where the period for which the state in which the certainty that the second person of interest is the registered person is larger than the threshold value is kept is shorter than the predetermined period, the updating unit 142 performs updating in such a way as not to lower the certainty that the first person of interest in the first region is the registered person. In this way, providing ranges to a processing time enables preventing a situation in which a result of recognition of a person of interest frequently fluctuates, even in a case where a false recognition has occurred in another region. Moreover, since each person moves around within a region, the degree of similarity may be estimated in different ways depending on visual differences. In this case, it can be considered that the degree of similarity between a person of interest and a registered person often fluctuates. In such a case, when a certainty that a given person of interest is a registered person has become stable, processing for reflecting the certainty in a result of estimation about another person of interest is performed, so that an advantageous effect which prevents mutual estimation results from frequently fluctuating can be attained.

In the first exemplary embodiment, while, as expressed by Assumption 1 and Assumption 2, in a case where the area certainty factor is high, the person certainty factor is increased, in a case where the area certainty factor is low, the person certainty factor is configured not to be corrected. However, in a case where the area certainty factor is low, since the person candidate image seems to be still not present in the applicable area even at the current time, the person certainty factor can be configured to be decreased.

More specifically, the updating unit 142 corrects a person certainty factor in such a way as to:

decrease the person certainty factor if the person candidate image has not been present in the same area at the last minute (Assumption 3).

In a second exemplary embodiment, although details of the method of correcting a person certainty factor are not specified, such a method can be implemented by acquiring a value L which satisfies the following formula (4) (formula (4-1) or formula (4-2) and then acquiring a person certainty factor 3 according to the following formula (5).

$$(\text{Area certainty factor}/p)^r + (L/q)^r = 1 (0 \leq \text{area certainty factor} < p) \quad (4\text{-}1)$$

In formula (4-1), $0 < p < 1$, $0 < q < 1$, and $0 < r < 1$ are specified.

$$L = 0 (\text{area certainty factor} \geq p) \quad (4\text{-}2)$$

$$\text{Person certainty factor3} = \text{person certainty factor2} \times (1-L) \quad (5)$$

Figure 18A:
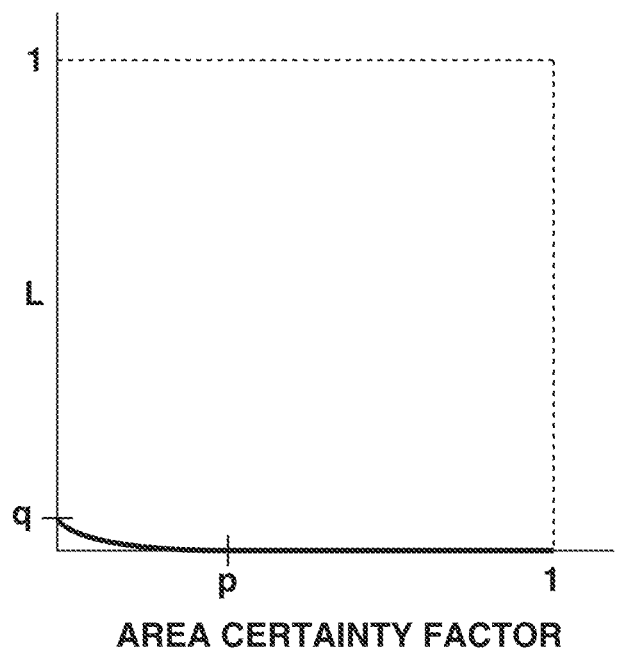
FIGS. 18A and 18B are diagrams illustrating examples of transitions of person certainty factors.
Figure 18B:
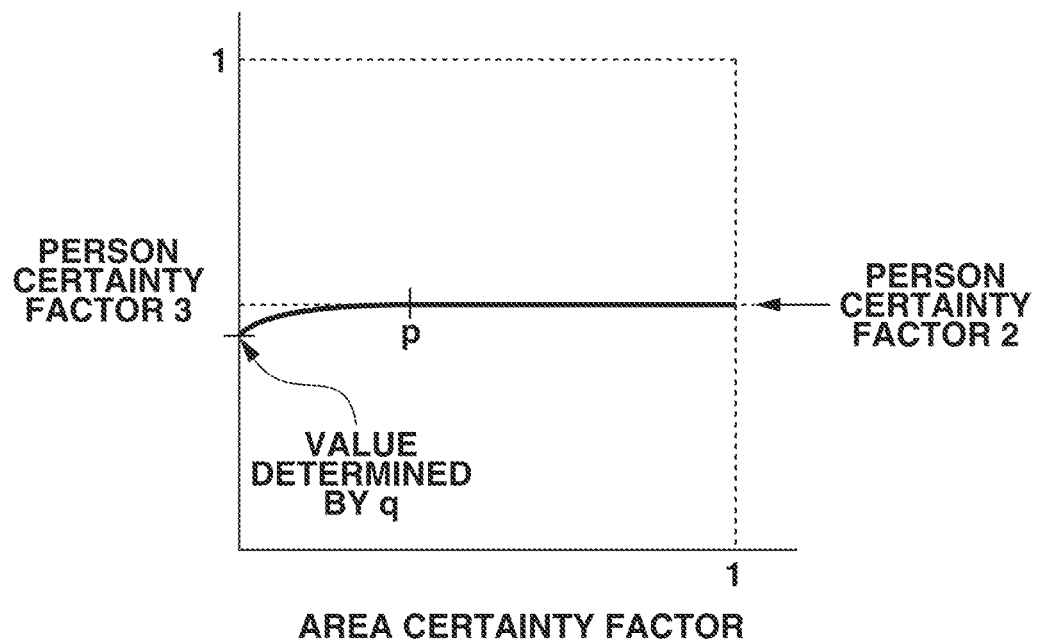

FIGS. 18A and 18B illustrate the value L, which is acquired by application of formula (4) and formula (5), and how the person certainty factor 2 is corrected into the person certainty factor 3, respectively. In this way, the updating unit 142 corrects the person certainty factor 0 into the person certainty factor 3.

In the first exemplary embodiment, area certainty factors and other-area certainty factors of all of the registered persons are acquired for each area and are then stored as an area certainty factor table. Therefore, each of the numbers of area certainty factors and other-area certainty factors to be stored becomes equal to the number of areas×the number of registered persons. In a case where the number of registered persons is large, the number of factors to be stored becomes huge, so that the amount of memory required for the area certainty factor table increases.

Furthermore, in formula (2) and formula (3) or in formula (5) when the value q is small, in a case where the area certainty factor or the other-area certainty factor is small, the degree to which a person certainty factor is corrected is small. Therefore, even if an area certainty factor or an other-area certainty factor the value of which is small is deemed to be zero, the results stay unchanged. Therefore, a third exemplary embodiment is configured to store an area certainty factor or an other-area certainty factor the value of which is large and not to store the other area certainty factors or other-area certainty factors, thus being able to substantially reduce the size of an area certainty factor table.

For example, for each area, only a predetermined number of area certainty factors can be stored in descending order of value. Similarly, for each area, only a predetermined number of other-area certainty factors can also be stored in descending order of value. Alternatively, for each area, only area certainty factors the value of each of which exceeds a predetermined value can be stored in descending order of value.

Similarly, for each area, only other-area certainty factors the value of each of which exceeds a predetermined value can be stored in descending order of value. Moreover, instead of each area, values to be stored can be selected over all of the areas. In other words, for all of the areas, only a predetermined number of area certainty factors can be stored in descending order of value. Similarly, for all of the areas, only a predetermined number of other-area certainty factors can also be stored in descending order of value. Alternatively, for all of the areas, only area certainty factors the value of each of which exceeds a predetermined value can be stored in descending order of value. Similarly, for all of the areas, only other-area certainty factors the value of each of which exceeds a predetermined value can be stored in descending order of value.

The above-described configuration enables substantially reducing the amount of memory required for an area certainty factor table.

In the first exemplary embodiment, an image capturing region of each camera (imaging apparatus 11) is set as an area. In this case, it is impossible to prevent a plurality of person candidate images contained in an image capturing region of the same camera from being erroneously recognized to be the same person. This may happen to no small extent in a case where many person candidate images are acquired from a captured image, such as in the case of a camera having a wide angle of view.

Therefore, in a fourth exemplary embodiment, each of portions into which an image capturing region of the camera is divided and which are not overlapping each other can be set as an area. Furthermore, instead of all of the portions obtained by division, each of some portions thereof can also be set as an area.

Figure 19:
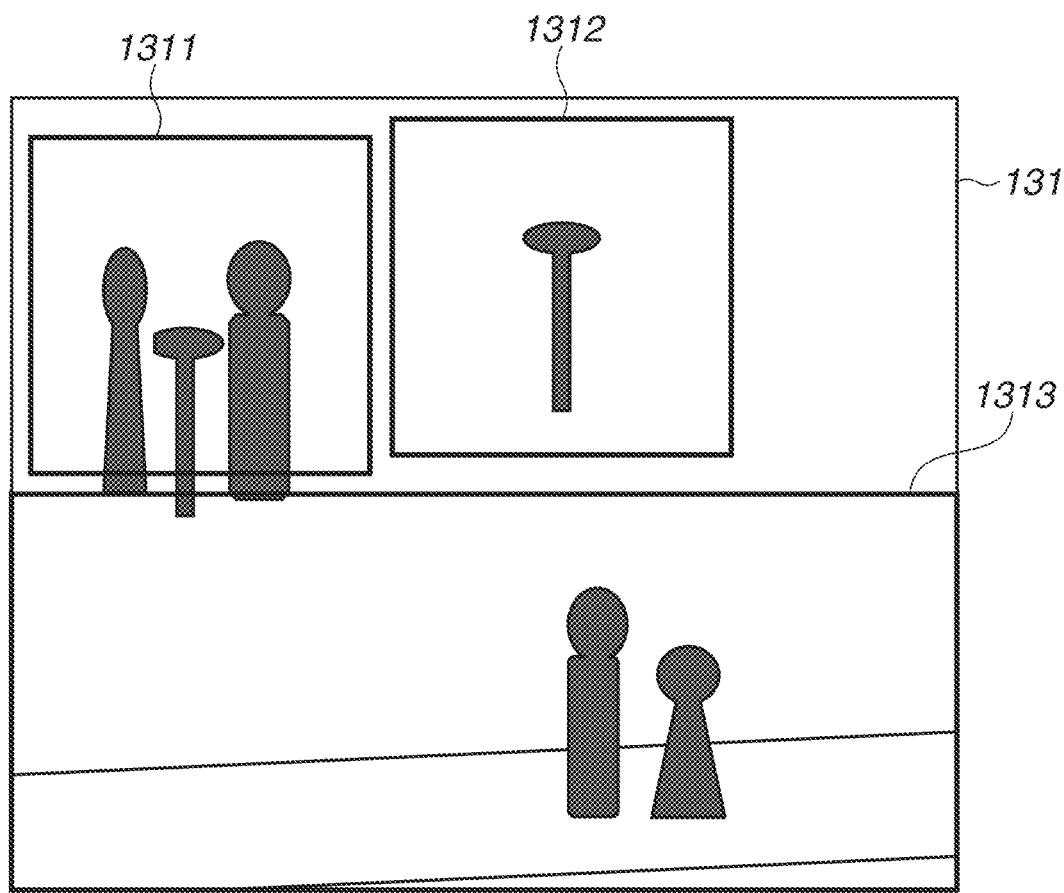
FIG. 19 is a diagram illustrating an example of an image capturing region divided into three areas.

FIG. 19 illustrates an example of an image capturing region of the camera which is divided as illustrated. The image capturing region 131 of the camera is divided into three portions 1311, 1312, and 1313, each of which is set as an area.

The above-described configuration enables preventing or reducing a plurality of person candidate images contained in an image capturing region of the same camera from being erroneously recognized to be the same person.

While, in the first exemplary embodiment, since one area is set by one camera, a plurality of cameras is required for application of the fourth exemplary embodiment, the fourth exemplary embodiment can be applied with one or a plurality of cameras used.

While, in the fourth exemplary embodiment, an image capturing region of the camera is divided in a fixed manner, a tracking unit can be added in combination to treat person candidate images having the same person tracking ID as images contained in the same area.

Figure 2B:
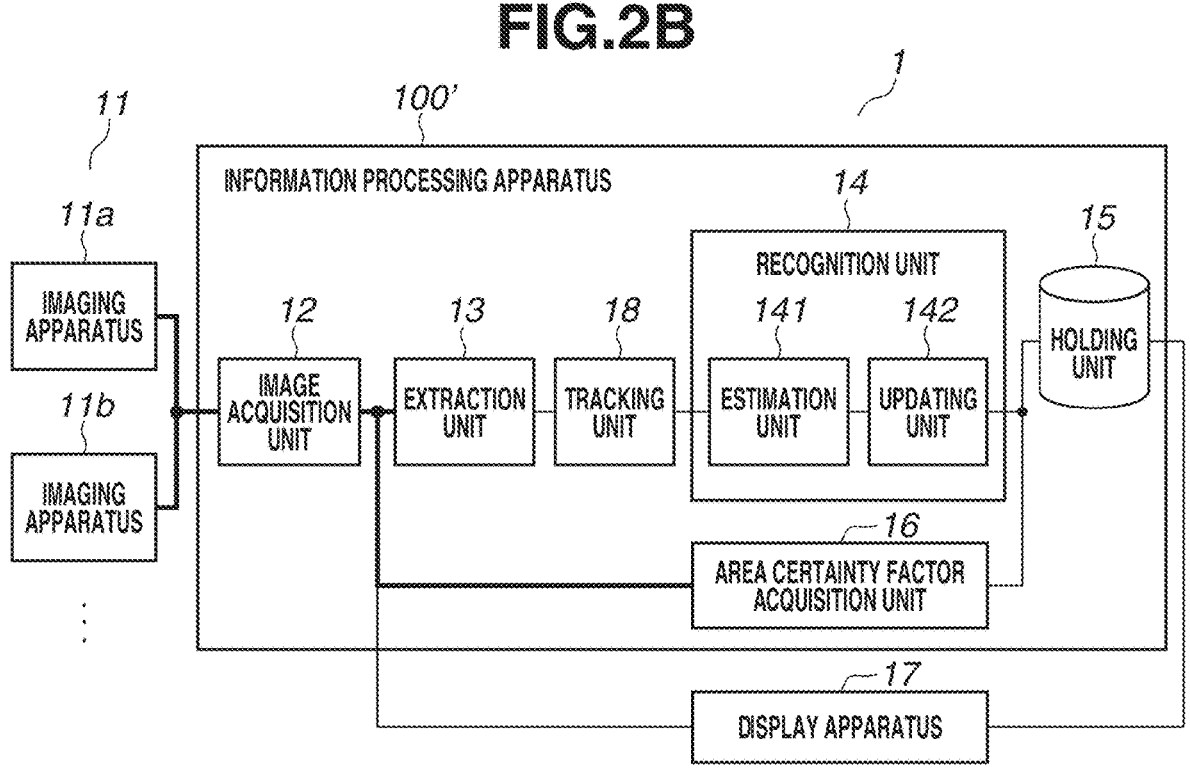

FIG. 2B is a diagram illustrating an example of a system configuration of an information processing system 1 to which a fifth exemplary embodiment is applied. A difference from FIG. 2A is that an information processing apparatus 100' additionally includes a tracking unit 18.

Since there is almost no difference in operations other than an operation of the tracking unit 18 as compared with the first exemplary embodiment, description focuses on the operation of the tracking unit 18. First, the tracking unit 18 tracks a person candidate image seeming to be the same person, and then assigns a person tracking ID to a tracking trajectory of the tracked person candidate image.

Figure 20A:
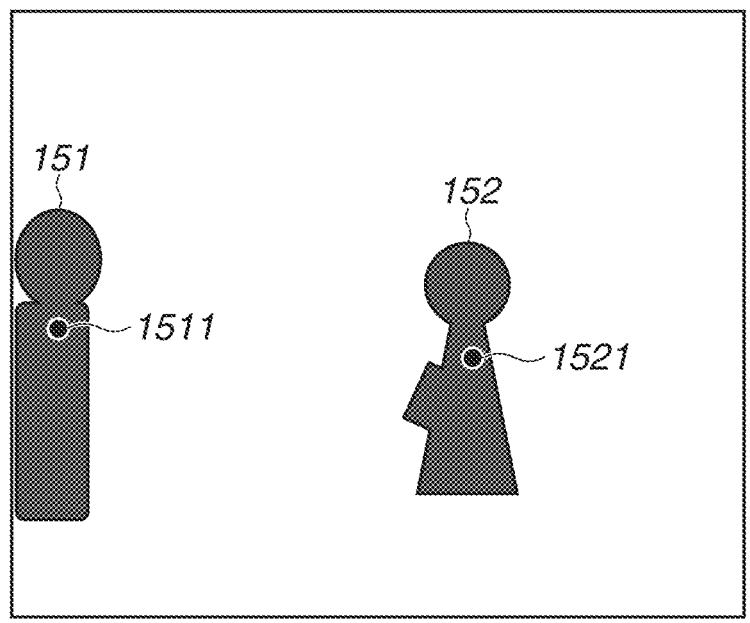
FIGS. 20A and 20B are diagrams used to explain an operation of a tracking unit.
Figure 20B:
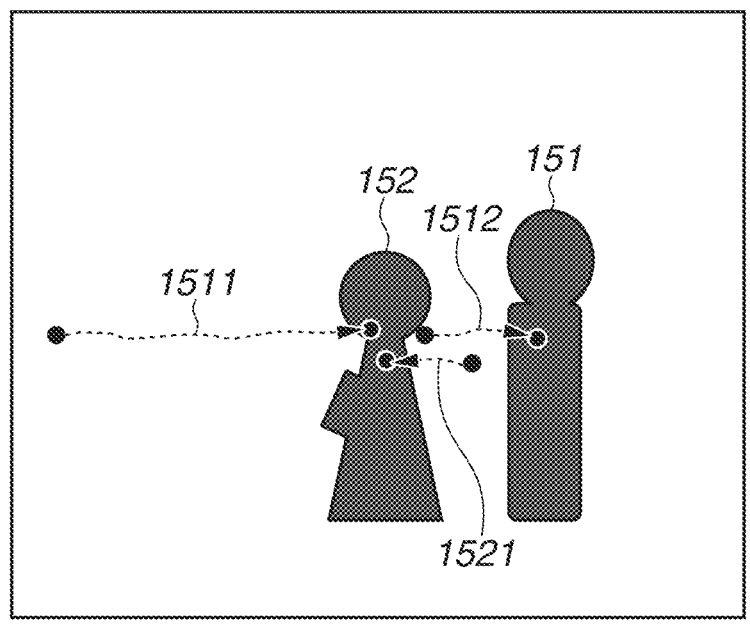

FIGS. 20A and 20B are diagrams used to explain an operation of the tracking unit 18. FIG. 20A illustrates an image obtained by a camera performing image capturing at a given point of time, in which a person 151 and a person 152 are contained. An image of each person is clipped as a person candidate image by the extraction unit 13, and each person candidate image is tracked by the tracking unit 18. The tracking unit 18 recognizes each person as a new person, and assigns respective new person tracking IDs to the person 151 and the person 152. Furthermore, for the sake of clarity, trajectories 1511 and 1521 of person tracking are indicated almost at the respective centers of human bodies of the person candidate images. Here, one person tracking ID is assumed to be assigned to each trajectory of person tracking. A trajectory of the same person may be interrupted by, for example, occlusion. In this case, while, depending on methods of person tracking, there are two cases of associating the same person tacking IDs with each other and of associating different person tacking IDs with each other, the fifth exemplary embodiment can be applied to both cases.

After that, as person candidate images are received one after another from the extraction unit 13, the tracking unit 18 recognizes that those are images obtained as a result of the person 151 and the person 152 having moved. FIG. 20B illustrates an image captured by the camera at a point of time a short later than the time of point of the image illustrated in FIG. 20A. Viewing the trajectories 1511 and 1521 of person tracking comes to see that two persons are moving in respective different directions. Furthermore, when the person 151 and the person 152 overlap each other, tracking of the person 151 stops, so that the trajectory 1511 of person tracking is interrupted. After overlapping disappears, tracking of the person 151 is restarted, so that a trajectory 1512 of person tracking is acquired with a new person tracking ID or the same person tracking ID.

In this way, the tracking unit 18 allocates a person tracking ID to each of person candidate images obtained from the extraction unit 13. Furthermore, the method of person tracking is a technique well known in this field, and details thereof are, therefore, omitted from description.

The tracking unit 18 outputs, to the recognition unit 14, a person candidate image with the allocated person tracking ID set as an area ID.

As described above, setting a person tracking ID as an area ID enables preventing or reducing person candidate images having respective different person tracking IDs from being erroneously recognized to be the same person. Moreover, while the person tracking trajectory of the person 151 is interrupted once, as can be seen in FIG. 16 and FIGS. 17A and 17B, the time of interruption being short enables preventing or reducing the person 151 from being erroneously recognized to be another person. Furthermore, while, in the first exemplary embodiment, since one area is set by one camera, a plurality of cameras is required, the fifth exemplary embodiment can be applied with one or a plurality of cameras used, as with the fourth exemplary embodiment.

The present disclosure can also be implemented by performing the following processing. Specifically, the processing supplies software (a program) for implementing the functions of the above-described exemplary embodiments to a system or apparatus via a network for data communication or any type of storage medium. Then, the processing causes a computer (or a CPU or micro processing unit (MPU)) of the system or apparatus to read out and execute the program. Moreover, the processing can record the program on a computer-readable recording medium and provide the recording medium.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2019-125114 filed Jul. 4, 2019, which is hereby incorporated by reference herein in its entirety.

What is claimed is:

1. An information processing apparatus comprising:
a processor; and
a memory storing executable instructions which, when executed by the processor, cause the image capturing apparatus to perform operations including:
estimating, based on a feature of a person of interest contained in an image captured in each of a plurality of regions and a feature of a previously set registered person, a certainty that the person of interest is the registered person; and
updating, with respect to a first person of interest subjected to image capturing in a first region out of the plurality of regions, in a case where a period for which a state in which a certainty that a second person of interest contained in an image captured in a second region different from the first region is the registered person is larger than a threshold value is kept is longer than a predetermined period, perform updating in such a way as to lower a certainty that the first person of interest in the first region is the registered person, and, in a case where the period for which the state in which the certainty that the second person of interest is the registered person is larger than the threshold value is kept is shorter than the predetermined period, perform updating in such a way as not to lower the certainty that the first person of interest in the first region is the registered person.

2. The information processing apparatus according to claim 1, wherein executing the executable instructions causes the information processing apparatus to perform further operations including: recognizing, in a case where the certainty that the updated person of interest is the registered person is larger than a predetermined threshold value, recognize that the person of interest is the registered person.

3. The information processing apparatus according to claim 1, wherein, in a case where the registered person includes a plurality of registered persons, a certainty that the person of interest is the registered person for each of the registered persons is estimated.

4. The information processing apparatus according to claim 1, wherein, in a case where the first person of interest present in the first region includes a plurality of first persons of interest, a certainty that the first persons of interest is the registered person for each of the first persons of interest is estimated.

5. The information processing apparatus according to claim 1,
wherein a certainty that the first person of interest present in the first region is the registered person and a certainty that the second person of interest contained in an image captured in the second region is the registered person are estimated, and
wherein the information processing apparatus wherein executing the executable instructions causes the information processing apparatus to perform further operations including: acquiring a certainty that the registered person is present in the first region based on the certainty that the first person of interest is the registered person or the certainty that the second person of interest is the registered person.

6. The information processing apparatus according to claim 5, wherein a certainty that the registered person is present in the second region is acquired based on the certainty that the second person of interest is the registered person, and wherein, in a case where a period for which a state in which the certainty that the registered person is present in the second region is larger than a threshold value is kept is longer than a predetermined period, decrease the certainty that the first person of interest present in the first region is the registered person, and, in a case where the period for which the state in which the certainty that the registered person is present in the second region is larger than the threshold value is kept is shorter than the predetermined period, does not update the certainty that the first person of interest present in the first region is the registered person.

7. The information processing apparatus according to claim 6, wherein, based on the certainty that the second person of interest is the registered person, in a case where the certainty that the second person of interest is the registered person is larger than a predetermined value, the certainty that the registered person is present in the second region becomes larger, and, in a case where the certainty that the second person of interest is the registered person is smaller than the predetermined value, the certainty that the registered person is present in the second region becomes smaller.

8. The information processing apparatus according to claim 5,
wherein a certainty that the registered person is present in the first region is acquired based on the certainty that the second person of interest is the registered person, and wherein, in a case where a period for which a state in which the certainty that the registered person is present in the first region is larger than a threshold value is kept is longer than a predetermined period, the certainty that the first person of interest present in the first region is the registered person is updated to increase, and, in a case where the period for which the state in which the certainty that the registered person is present in the first region is larger than the threshold value is kept is shorter than the predetermined period, the certainty that the first person of interest present in the first region is the registered person is not updated.

9. The information processing apparatus according to claim 8, wherein, based on the certainty that the second person of interest is the registered person, in a case where the certainty that the second person of interest is the registered person is larger than a predetermined value, an acquisition is performed in such a manner that the certainty that the registered person is present in the first region becomes smaller, and, in a case where the certainty that the second person of interest is the registered person is smaller than the predetermined value, an acquisition is performed in such a manner that the certainty that the registered person is present in the first region becomes larger.

10. The information processing apparatus according to claim 5, wherein, in a case where a period for which a state in which the certainty that the registered person is present in the first region is larger than a threshold value is kept is longer than a predetermined period, an update is performed in such a way as to increase the certainty that the first person of interest is the registered person, and, in a case where the period for which the state in which the certainty that the registered person is present in the first region is larger than the threshold value is kept is shorter than the predetermined period, an update is not performed to update the certainty that the first person of interest is the registered person.

11. The information processing apparatus according to claim 1, wherein executing the executable instructions causes the information processing apparatus to perform further operations including: extracting partial images each having a feature of a person from images captured in the plurality of regions,
wherein a certainty is estimated that the person of interest is the registered person for each of the extracted partial images.

12. The information processing apparatus according to claim 1, wherein a certainty that the first person of interest contained in an image captured in the first region at first time is the registered person and a certainty that the second person of interest contained in an image captured in the second region at the first time is the registered personare estimated.

13. The information processing apparatus according to claim 1, wherein executing the executable instructions causes the information processing apparatus to perform further operations including: storing first time information indicating a certainty that the first person of interest contained in an image captured in the first region at first time is the registered person,
wherein the certainty that the first person of interest is the registered person is updated based on second time information indicating a certainty that the first person of interest contained in an image captured in the first region at second time later than the first time is the registered person and the stored first time information.

14. The information processing apparatus according to claim 13, wherein, based on the first time information, in a case where the certainty that the first person of interest contained in an image captured in the first region at the first time is the registered person is smaller than a predetermined threshold value, the certainty that the first person of interest is the registered person is updated to a smaller value, and, in a case where the certainty that the first person of interest contained in an image captured in the first region at the first time is the registered person is larger than the predetermined threshold value, the certainty that the first person of interest is the registered person is updated to a larger value.

15. The information processing apparatus according to claim 13, wherein, based on at least one of first region information indicating a certainty that the registered person is present in the first region at first time and second region information indicating a certainty that the registered person is present in the second region at the first time, a certainty that the registered person is present in the first region at second time later than the first time is updated.

16. The information processing apparatus according to claim 15, wherein, based on the first region information indicating the certainty that the registered person is present in the first region at the first time, in a case where the certainty that the registered person is present in the first region at the first time is larger than a predetermined value, the certainty that the registered person is present in the first region at the second time is updated to increase, and, in a case where the certainty that the registered person is present in the first region at the first time is smaller than the predetermined value, decease the certainty that the registered person is present in the first region at the second time is updated to decrease.

17. The information processing apparatus according to claim 15, wherein, based on the second region information indicating the certainty that the registered person is present in the second region at the first time, in a case where the certainty that the registered person is present in the second region at the first time is larger than a predetermined value, the certainty that the registered person is present in the first region at the second time is updated to decrease, and, in a case where the certainty that the registered person is present in the second region at the first time is smaller than the predetermined value, the certainty that the registered person is present in the first region at the second time is updated to increase.

18. The information processing apparatus according to claim 13, wherein a certainty that the first person of interest is the registered person is estimated based on a certainty that the registered person is present in the first region at time earlier than the first time.

19. An information processing method comprising:
- estimating, based on a feature of a person of interest contained in an image captured in each of a plurality of regions and a feature of a previously set registered person, a certainty that the person of interest is the registered person; and
- with respect to a first person of interest subjected to image capturing in a first region out of the plurality of regions, in a case where a period for which a state in which a certainty that a second person of interest contained in an image captured in a second region different from the first region is the registered person is larger than a threshold value is kept is longer than a predetermined period, performing updating in such a way as to lower a certainty that the first person of interest in the first region is the registered person, and, in a case where the period for which the state in which the certainty that the second person of interest is the registered person is larger than the threshold value is kept is shorter than the predetermined period, performing updating in such a way as not to lower the certainty that the first person of interest in the first region is the registered person.

20. A non-transitory computer-readable storage medium storing computer-executable instructions that, when executed by a computer, cause the computer to perform a method comprising:
- estimating, based on a feature of a person of interest contained in an image captured in each of a plurality of regions and a feature of a previously set registered person, a certainty that the person of interest is the registered person; and
- with respect to a first person of interest subjected to image capturing in a first region out of the plurality of regions, in a case where a period for which a state in which a certainty that a second person of interest contained in an image captured in a second region different from the first region is the registered person is larger than a threshold value is kept is longer than a predetermined period, performing updating in such a way as to lower a certainty that the first person of interest in the first region is the registered person, and, in a case where the period for which the state in which the certainty that the second person of interest is the registered person is larger than the threshold value is kept is shorter than the predetermined period, performing updating in such a way as not to lower the certainty that the first person of interest in the first region is the registered person.

* * * * *